US012752302B2

(12) United States Patent
Suto

(10) Patent No.: US 12,752,302 B2
(45) Date of Patent: Oct. 6, 2026

(54) STRUCTURE, VIBRATING DEVICE, AND SENSORY ACOUSTIC APPARATUS

(71) Applicant: NATURE ARCHITECTS INC., Tokyo (JP)

(72) Inventor: Kai Suto, Tokyo (JP)

(73) Assignee: NATURE ARCHITECTS INC., Tokyo (JP)

( * ) Notice: Subject to any disclaimer, the term of this patent is extended or adjusted under 35 U.S.C. 154(b) by 606 days.

(21) Appl. No.: 18/284,160

(22) PCT Filed: Mar. 30, 2022

(86) PCT No.: PCT/JP2022/015850

§ 371 (c)(1),
(2) Date: Sep. 26, 2023

(87) PCT Pub. No.: WO2022/210846

PCT Pub. Date: Oct. 6, 2022

(65) Prior Publication Data

US 2024/0165669 A1 May 23, 2024

(30) Foreign Application Priority Data

Mar. 31, 2021 (JP) ................................ 2021-058978

(51) Int. Cl.
*H01L 41/053* (2006.01)
*B06B 3/02* (2006.01)
*G05D 19/00* (2006.01)

(52) U.S. Cl.
CPC ............... *B06B 3/02* (2013.01); *G05D 19/00* (2013.01)

(58) Field of Classification Search
CPC ............................ H10N 30/886; G05D 19/00
(Continued)

(56) References Cited

U.S. PATENT DOCUMENTS 6,680,559 B2 * 1/2004 Ishitoko ............. G01C 19/5663 310/348
2003/0227225 A1 12/2003 Kaneda et al.
(Continued)

FOREIGN PATENT DOCUMENTS

CN 201921093 U 8/2011
CN 202610689 U 12/2012
(Continued)

OTHER PUBLICATIONS

European Patent Office, Extended European Search Report for European Patent Application No. 22781057.9, dated Feb. 26, 2025, 10pp.

(Continued)

*Primary Examiner* — Derek J Rosenau
(74) *Attorney, Agent, or Firm* — The Roy Gross Law Firm, LLC; Roy D. Gross

(57) ABSTRACT

A structure 100 according to an embodiment of the present disclosure includes: a vibration part 110 configured to hold a vibrating member; a housing 120 configured to at least partially house the vibration part 110; and supporting parts 130SR, 130SL configured to support the vibration part 110 by coupling the vibration part 110 and the housing 120, wherein the supporting parts 130SR, 130SL are each configured to have a dynamic stiffness that amplifies or attenuates transmission of a vibration of at least a predetermined frequency in vibrations generated in at least one direction by the vibration part 110 in a state of holding the vibrating member, and a static stiffness required for supporting the vibration part 110 in the state of holding the vibrating member. A system including the structure 100 and the vibrating member has characteristics in which a vibration transmittance gradually decreases, as a vibration frequency of the vibration in the at least one direction increases, after exhibiting an excited vibration mode in which the vibration
(Continued)

transmittance is increased. The supporting parts 130SR, 130SL have the dynamic stiffness that exhibits the excited vibration mode such that the vibration transmittance at the predetermined frequency is greater or smaller than 1.

10 Claims, 12 Drawing Sheets

(58) Field of Classification Search
USPC ................................ 310/323.01–323.21, 348
See application file for complete search history.

(56) References Cited

U.S. PATENT DOCUMENTS

| | | | | |
|---|---|---|---|---|
| 2005/0015027 | A1 | 1/2005 | Kojima | |
| 2006/0175938 | A1* | 8/2006 | Imamura | G01C 19/56 310/348 |
| 2007/0195059 | A1 | 8/2007 | Shahoian et al. | |
| 2009/0045700 | A1 | 2/2009 | Sasaki et al. | |
| 2015/0214462 | A1* | 7/2015 | Zolfagharkhani | H10N 30/40 310/369 |
| 2020/0136488 | A1 | 4/2020 | Takahashi et al. | |

FOREIGN PATENT DOCUMENTS

| | | | |
|---|---|---|---|
| CN | 111075873 | A | 4/2020 |
| EP | 3758391 | A1 | 12/2020 |
| JP | 08-149862 | A | 6/1996 |
| JP | 2003269395 | A | 9/2003 |
| JP | 2003274468 | A | 9/2003 |
| JP | 5169817 | B2 | 7/2009 |
| JP | 2009225535 | A | 10/2009 |
| JP | 2015146718 | A | 8/2015 |
| JP | 2019104454 | A | 6/2019 |
| JP | 2019130979 | A | 8/2019 |

OTHER PUBLICATIONS

PCT International Search Report for International Application No. PCT/JP2022/015850, mailed May 31, 2022, 7pp.

PCT Written Opinion for International Application No. PCT/JP2022/015850, mailed May 31, 2022, 5pp.

* cited by examiner

STRUCTURE, VIBRATING DEVICE, AND SENSORY ACOUSTIC APPARATUS

CROSS REFERENCE TO RELATED APPLICATIONS

This application is a National Phase of PCT Patent Application No. PCT/JP2022/015850 having International filing date of Mar. 30, 2022, which claims the benefit of priority of Japanese Patent Application No. 2021-058978, filed Mar. 31, 2021, the contents of which are all incorporated herein by reference in their entirety.

TECHNICAL FIELD

The present disclosure relates to a structure, a vibration device, and a sensory acoustic apparatus.

BACKGROUND ART

In the related art, a sensory acoustic apparatus including a vibration device is known. The vibration device is driven by an electromagnet that converts an electric signal into a mechanical vibration, for example. By driving the vibration device in a state where the vibration device is in direct or indirect contact with the body of a user, the user can feel an acoustic sensory generated by the vibration of the vibration device.

A sensory acoustic apparatus composed of the vibration device embedded inside a chair or a cushion is known (see PTL 1). Such a sensory acoustic apparatus is sometimes used to enhance a sense of immersion in content composed of images and sounds. A user sits or leans on the sensory acoustic apparatus to view the content. The user can experience high sense of immersion by experiencing an acoustic sensory generated by the vibration of the sensory acoustic apparatus in addition to the images and sounds of the content.

CITATION LIST

Patent Literature

PTL 1

Japanese Patent Application Laid-Open No. 2003-274468

SUMMARY OF INVENTION

Technical Problem

It is required for the vibration device used for the sensory acoustic apparatus to generate a vibration with an intensity required for allowing the user to feel the acoustic sensory, and have a rigidity against the load of the user's weight and the like (i.e., load carrying capacity). However, these two requirements involve a trade-off. In general, when a supporting part for supporting a vibration part of the vibration device has a high rigidity, the load carrying capacity of the vibration device is improved, but it is difficult to increase a vibration intensity because the amplitude of the vibration of the vibration part is limited. In addition, there is a need for the vibration device used for the sensory acoustic apparatus to increase the intensity of the vibration of a certain frequency, while reducing the intensity of the vibration of a different frequency, for example.

In addition, in a sensory acoustic apparatus including a plurality of vibration devices, mutual interference between the vibration devices may degrade quality of the sensory acoustic in some situation. More specifically, in some situation the vibration generated at the vibration device propagates to the outside so as to interfere (resonate or cancel each other) with vibrations of other vibration devices.

Solution to Problem

A structure according to an aspect of the present disclosure includes: a vibration part configured to hold a vibrating member; a housing configured to at least partially house the vibration part; and a supporting part configured to support the vibration part by coupling the vibration part and the housing. The supporting part is configured to have a dynamic stiffness that amplifies or attenuates transmission of a vibration of at least a predetermined frequency in a vibration generated in at least one direction by the vibration part in a state of holding the vibrating member, and a static stiffness required for supporting the vibration part in the state of holding the vibrating member. A system including the structure and the vibrating member has characteristics in which a vibration transmittance gradually decreases, as a vibration frequency of the vibration in the at least one direction increases, after exhibiting an excited vibration mode in which the vibration transmittance is increased. In a case where the dynamic stiffness that amplifies the transmission of the vibration of at least the predetermined frequency is provided, the supporting part further has the dynamic stiffness that exhibits the excited vibration mode such that the vibration transmittance at the predetermined frequency is greater than 1. In a case where the dynamic stiffness that attenuates the transmission of the vibration of at least the predetermined frequency is provided, the supporting part further has the dynamic stiffness that exhibits the excited vibration mode such that the vibration transmittance at the predetermined frequency is smaller than 1.

DESCRIPTION OF EMBODIMENTS

Concept of the Present Invention

Figure 1:
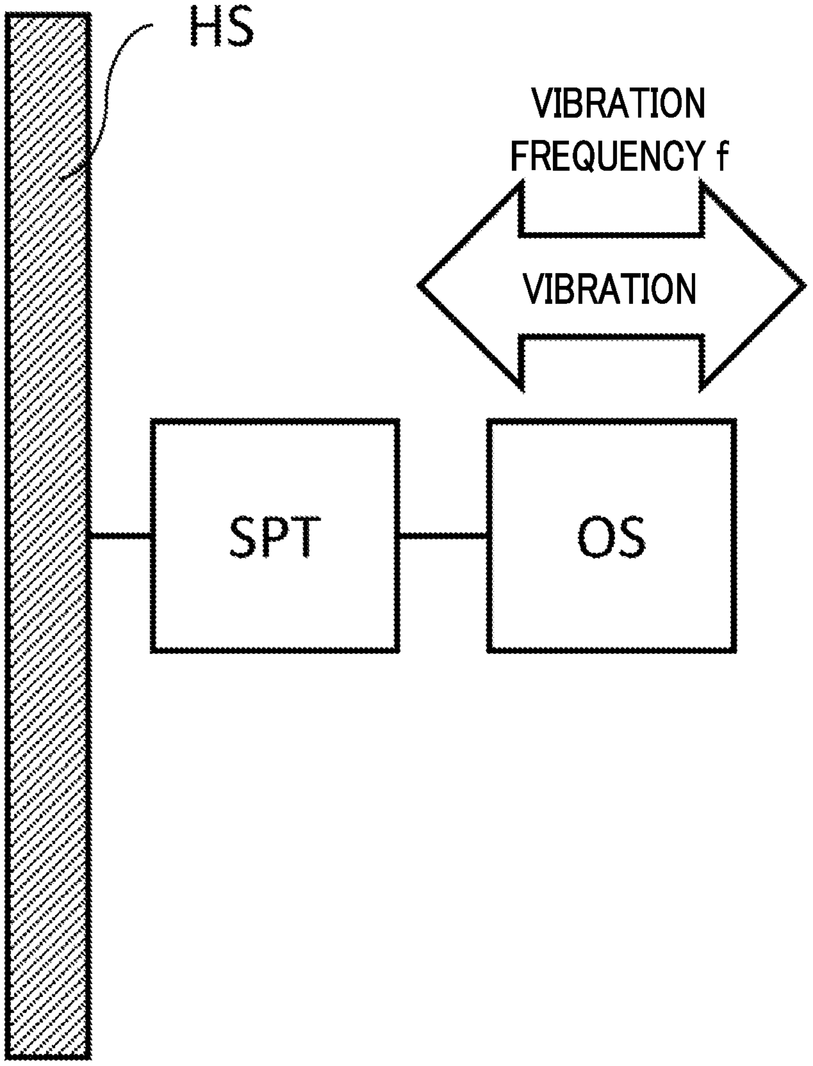
FIG. 1 is a diagram illustrating a system including a structure of a first embodiment of the present invention.

First, a concept of the present invention is described.

As described above, known techniques involve a trade-off in which dynamic performance is reduced to reduce an achievable vibration intensity when a supportable load (load carrying capacity) is increased to increase static performance, whereas the static performance is reduced to reduce the supportable load when the dynamic performance is increased to increase the achievable vibration intensity. Conversely, the inventor of the present invention has designed and analyzed various structures, and consequently devised a structure and a design method of the same according to the present invention with an idea of solving the above-described trade-off by isolating a vibration mode in a vibration direction in which a vibration intensity is desired to be increased or reduced from vibration modes in other directions and providing a rigidity that can support an assumed load while amplifying or attenuating a vibration of a vibration source in such a vibration direction.

As described above, the concept of the present invention is to provide a structure with a rigidity that can support an assumed load while amplifying or attenuating a vibration of a vibrating member in a direction in which a vibration intensity is desired to be increased or reduced. As an example, the present invention provides a structure that can amplify or attenuate the vibration of the vibration source by softening dynamic rigidity in the direction in which the vibration intensity is desired to be increased or reduced and that has static rigidity required for supporting the assumed load.

EMBODIMENTS OF THE PRESENT INVENTION

Embodiments of the present invention are elaborated below with reference to the drawings. Note that in the diagrams for describing the embodiments, the same components are basically denoted with the same reference numerals, and reiterated descriptions are omitted.

In the following description, an upper side (T-direction), a lower side (B-direction), a front side (F-direction), a rear side (R-direction), a left side (SL-direction), and a right side (SR-direction) are defined with respect to a structure in a predetermined orientation as a reference.

In the following description in the specification and the recitation in the attached claims, a rotation may mean not only a rotation in one direction (clockwise or counterclockwise) but also a bidirectional (clockwise and counterclockwise) alternate rotation.

(1) First Embodiment

A first embodiment is described below. A structure of the first embodiment includes a vibration part, a housing, and a supporting part. The vibration part holds a vibrating member. The housing at least partially houses the vibration part. The supporting part couples the vibration part and the housing to support the vibration part. The vibration part in a state of holding the vibrating member vibrates in at least one direction.

The supporting part of the structure of the first embodiment is configured to have a dynamic stiffness that amplifies a vibration of at least a predetermined frequency in vibrations generated by the vibration part in the state of holding the vibrating member. At the same time, this supporting part is configured to have a static stiffness required for supporting at least the vibration part in the state of holding the vibrating member. That is, this supporting part can ensure a rigidity (static stiffness) enough to stabilize the positional orientation of the vibration part in the state of holding the vibrating member against an assumed load, and can increase a vibration intensity for at least the predetermined frequency in the vibrations generated by the vibration part.

As an example, "dynamic stiffness" means a rigidity represented by a relationship between a dynamic force or a dynamic moment and a resulting dynamic displacement, and "static stiffness" means a rigidity represented by a relationship between a static force or a static moment and a resulting static displacement/deformation.

Basic Principle

Figure 2A:
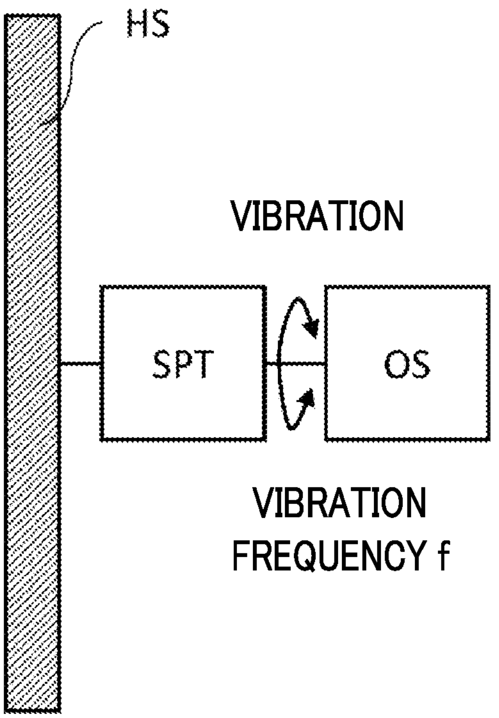
FIGS. 2A and 2B are diagrams illustrating other examples of FIG. 1.
Figure 2B:
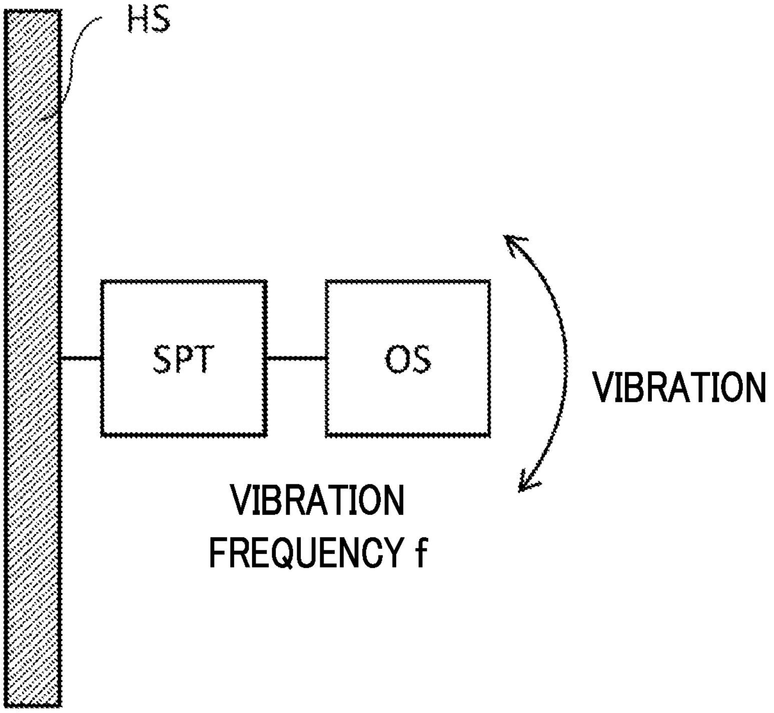

A basic principle of the structure of the first embodiment is described below. FIG. 1 is a diagram illustrating a system including the structure of the first embodiment. FIGS. 2A and 2B are diagrams illustrating other examples of FIG. 1.

As illustrated in FIG. 1, a supporting part SPT of the first embodiment couples a vibration part OS in the state of holding the vibrating member and a housing HS to support the vibration part OS. The vibration part OS vibrates at a vibration frequency f.

Note that in FIG. 1 the vibration part OS in the state of holding the vibrating member is illustrated as if it vibrates in a linear reciprocation motion (hereinafter referred to as "back-and-forth linear vibration") as an example, but the vibration direction of the vibration part OS is arbitrary. For example, the vibration part OS may vibrate in a rotational movement (hereinafter referred to as "rotation vibration") as illustrated in FIG. 2A, or may vibrate in a sway motion (hereinafter referred to as "sway vibration") as illustrated in FIG. 2B. Alternatively, the vibration of the vibration part OS may be any combination of the above-described vibration modes.

Dynamic Stiffness

Figure 3:
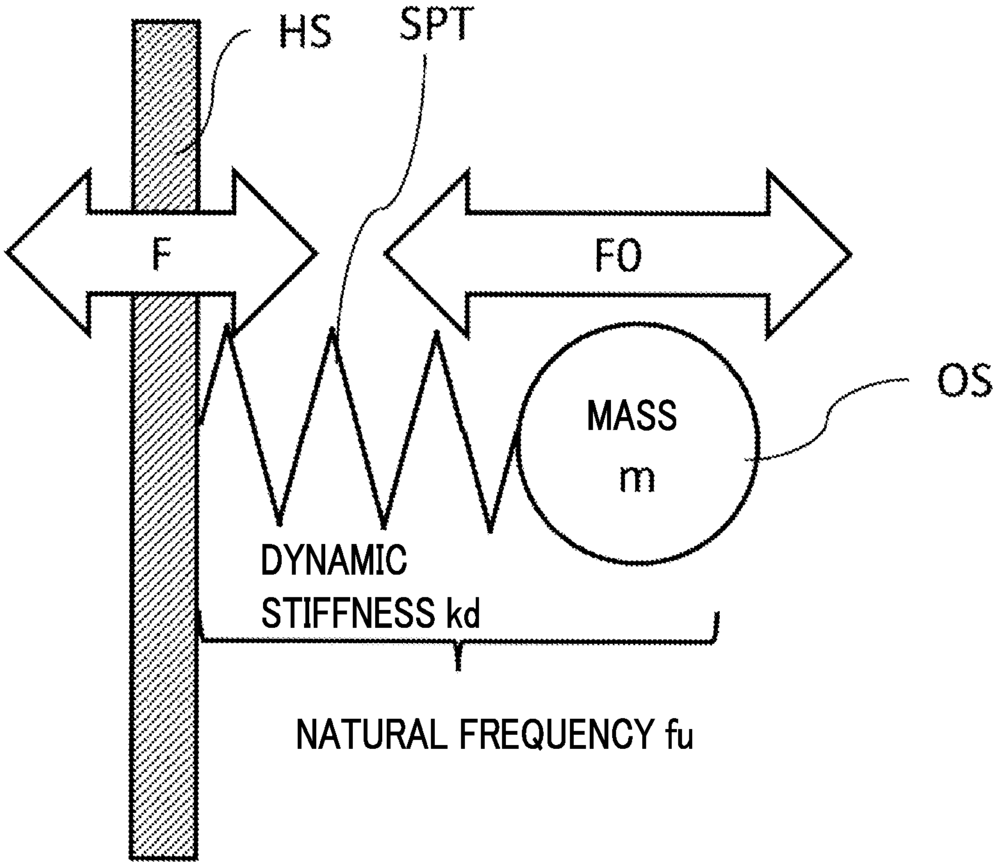
FIG. 3 is a diagram illustrating a vibration model in the system of FIG. 1.
Figure 4:
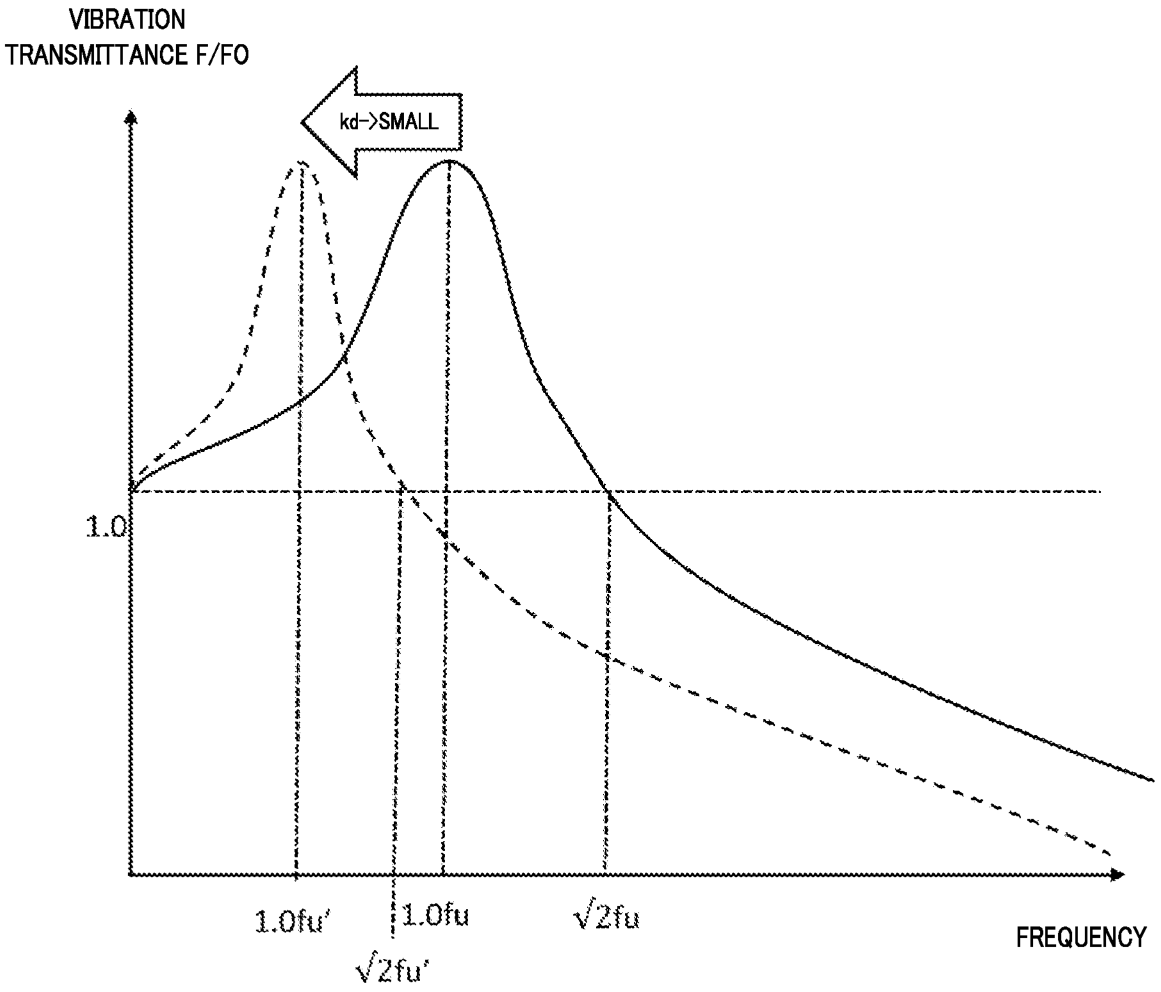
FIG. 4 is a graph illustrating frequency characteristics of a vibration transmittance of the model of FIG. 3.

The dynamic stiffness of the supporting part of the structure of the first embodiment is described below. FIG. 3 is a diagram illustrating a vibration model in the system of FIG. 1. FIG. 4 is a graph illustrating frequency characteristics of a vibration transmittance of the model of FIG. 3.

The supporting part SPT is configured to have a dynamic stiffness that amplifies a vibration of at least the vibration frequency f in the vibrations generated by the vibration part OS in the state of holding the vibrating member. This is described below with reference to FIG. 3 as vibration transmission characteristics from the vibration part OS to the housing HS. At each frequency, the vibration transmission characteristics from the vibration part OS to the housing HS is determined by a mass m of the vibration part OS and a dynamic stiffness kd of the supporting part SPT with respect to the vibration direction of the vibration part OS.

A ratio F/F0 of an excitation force F transmitted to the housing HS with respect to an excitation force F0 generated by the vibration part OS in the state of holding the vibrating member is defined as the vibration transmittance. As illustrated with a solid line in the graph of FIG. 4, the model of FIG. 3 has frequency characteristics in which the vibration transmittance gradually decreases, as the frequency increases, after exhibiting an excited vibration mode in which the vibration transmittance is increased. More specifically, the vibration transmittance of the model of FIG. 3 increases as the frequency increases in the frequency range equal to or smaller than fu, and reaches at its maximum at fu. Here, fu is a natural frequency of the model of FIG. 3. The vibration transmittance of the model of FIG. 3 gradually decreases in the frequency range equal to or greater than the natural frequency fu, and zero-crosses at √2fu. That is, in the model of FIG. 3 the vibration transmittance is greater than 1, i.e., the vibration intensity can be amplified, in the frequency range smaller than √2fu.

The natural frequency of the model of FIG. 3 is determined by the mass m and the dynamic stiffness kd. The lower the natural frequency with the dynamic stiffness kd reduced, the more the vibration transmittance in a low frequency range can be increased, and conversely, the higher the natural frequency with the dynamic stiffness kd increased, the more the vibration transmittance in a high frequency range can be increased.

A case where the natural frequency is reduced is described below as an example. As is clear from FIG. 4, the vibration transmittance of the low frequency range (e.g., the frequency range equal to or smaller than fu') in the frequency characteristics of the system in which the natural frequency is set to fu' smaller than fu (the graph indicated by a dotted line in FIG. 4) is greater than the vibration transmittance in the frequency characteristics of the system of the natural frequency fu indicated by the solid line in FIG. 4. Since the mass m is a constant, the natural frequency fu can be reduced by reducing the dynamic stiffness kd. Therefore, from a view point of improvement in vibration transmittance in the low frequency range, the smaller the dynamic stiffness kd of the supporting part SPT with respect to the vibration direction of the vibration part OS in the state of holding the vibrating member, the more preferable.

Based on the above-described findings, in the supporting part SPT of the present embodiment the dynamic stiffness kd is set so as to have at least the natural frequency fu with which the vibration transmittance at the predetermined vibration frequency f at which the vibration transmission is especially desired to be amplified is greater than 1, in frequency components of the vibrations generated by the vibration part OS in the state of holding the vibrating member. The system including the supporting part SPT having such a dynamic stiffness kd and the vibration part OS exhibits an excited vibration mode in which the vibration transmittance at the vibration frequency f is greater than 1. More specifically, the supporting part SPT is configured to have the dynamic stiffness kd with which for the given vibration direction, mass m, and vibration frequency f of the vibration part OS, the natural frequency fu of the system including the supporting part SPT and the vibration part OS is higher than 1/√2 times the vibration frequency f, more preferably coincides with the vibration frequency f.

Note that to what degree the natural frequency fu of the system including the supporting part SPT and the vibration part OS in the state of holding the vibrating member is set, and how the value of the dynamic stiffness kd is set for that, may be determined as necessary in accordance with what degree of an amplification effect is desired to be achieved at the predetermined vibration frequency f at which the vibration intensity is required to be increased, i.e., in accordance with how much the vibration transmittance at the predetermined vibration frequency f is desired to be increased.

Here, the dynamic stiffness kd of the supporting part SPT can be derived in the following procedure, for example.

(1) One end of the supporting part SPT is connected to the housing HS, and the other end of the supporting part SPT is connected to a weight with the same mass m as the vibration part OS in the state of holding the vibrating member.

(2) Natural vibration analysis is performed on the system of (1), and one or more pairs of the natural frequency and a natural vibration mode are specified.

(3) A pair or pairs in which the weight is vibrated in a targeted excitation direction (the vibration direction of the vibration part OS) is/are extracted from among the one or more pairs of the natural frequency and the natural vibration mode specified in (2).

(4) The pair or pairs extracted in (3) is/are sorted in order of decreasing natural frequency.

(5) The dynamic stiffness kd is calculated by the following expression:

$$kd=m*(2\pi*fu1)^2$$

where fu1 represents the minimum natural frequency obtained in (4).

With the above-described expression, by specifying a natural frequency fu' required for obtaining a desired vibration transmittance at the predetermined vibration frequency f at which the vibration intensity is desired to be increased, a dynamic stiffness kd' for achieving that natural frequency fu' can be calculated.

Note that while the concept of "vibration transmittance" is used in the above description regarding the "dynamic stiffness" of the supporting part in the present embodiment, this is intended to describe the dynamic stiffness that the supporting part should have in order to increase the vibration intensity of the vibration part in the present embodiment, and does not mean that the structure of the present embodiment transmits the vibration of the vibration part to the housing. As elaborated below, the structure of the present embodiment can increase the vibration intensity of the vibration part by providing the supporting part with the dynamic stiffness that can exhibit the vibration amplification effect at the predetermined vibration frequency f at which the vibration intensity of the vibration part is desired to be increased, and increasing the displacement (amplitude) amount of the supporting part in the vibration direction of the vibration part. On the other hand, in the structure of the present embodiment, the vibration part is supported by the supporting part in a state of being suspended to the housing, and thus the transmission of the vibration of the vibration part to the housing is suppressed, and further the propagation of its vibration to the outside of the structure is suppressed.

Static Stiffness

Figure 5:
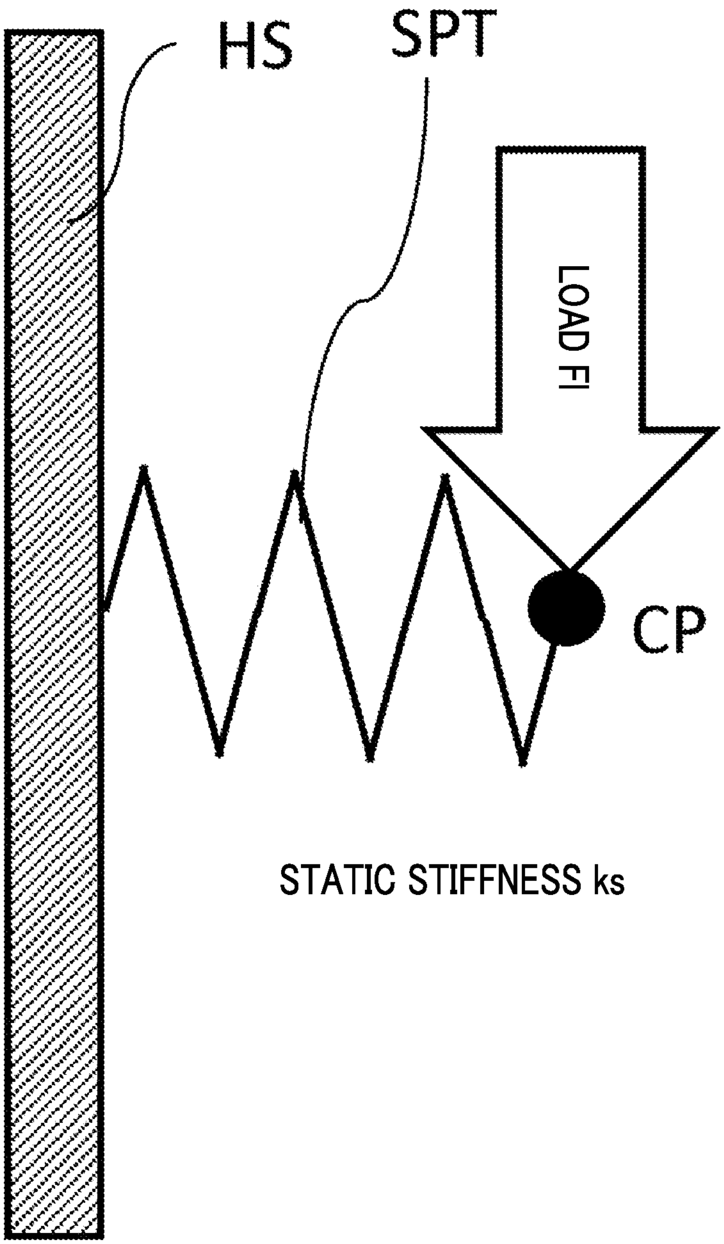
FIG. 5 is a diagram illustrating an analysis model of a static stiffness of a supporting part of the structure of the first embodiment of the present invention.

The static stiffness of the structure of the first embodiment is described below. FIG. 5 illustrates an analysis model of the static stiffness of the supporting part of the structure of the first embodiment.

The supporting part SPT is configured to have a static stiffness required for supporting the vibration part OS in the state of holding the vibrating member. More specifically, as illustrated in FIG. 5, the supporting part SPT has a static stiffness ks required for supporting the vibration part OS for a design load Fl applied to the vibration part OS. Supporting the vibration part OS may mean stabilizing the positional orientation of the vibration part OS even when the design load Fl is applied, for example. Stabilizing the positional orientation may mean suppressing the displacement (including rotational displacement) due to the application of the design load Fl within an acceptable range.

The design load Fl is various loads that are assumed in the use condition of the system including the vibration part OS in the state of holding the vibrating member and the supporting part SPT. As an example, the design load Fl may include at least one of the following.

Gravity (e.g., gravity due to own weight of the vibration part OS in the state of holding the vibrating member and user's weight acting on the vibration part OS)

Inertia force

In the model of FIG. 5, the static stiffness ks can be derived by the following expression:

$$ks=Fl/d$$

where d represents a displacement amount of the supporting part SPT when the design load Fl is applied to contact point CP with the vibration part OS in the state of holding the vibrating member in the supporting part SPT.

Here, the greater the static stiffness ks with respect to the application direction of the design load Fl, the smaller the displacement amount d of the supporting part SPT due to the design load Fl (i.e., the positional orientation of the vibration part OS in the state of holding the vibrating member is stable even when the design load Fl is applied). The static stiffness ks required for supporting the vibration part OS against the design load Fl can be defined as a static stiffness with which the displacement amount of the supporting part SPT falls within a designed acceptable range when the value of the design load Fl is set to an assumed maximum value in the model of FIG. 5, for example.

The supporting part SPT is configured to have a static strength required for supporting the vibration part OS by providing the supporting part SPT with the static stiffness ks required for supporting the vibration part OS in the state of holding the vibrating member against the design load Fl in this manner. More specifically, the continuous distribution of the stress exerted on the supporting part SPT when the value of the design load Fl is set to an assumed maximum value in the model of FIG. 5 is obtained through analysis. Then, the shape, position, material, or their combinations of the supporting part SPT are determined such that the maximum value of the stress distribution (i.e., the maximum value of the stress assumed to be locally generated in the supporting part SPT due to the design load Fl) is equal to or smaller than an acceptable stress of the material making up the supporting part SPT. In this manner, even when the assumed maximum design load Fl is applied to the vibration part OS, the supporting part SPT can stabilize the positional orientation of the vibration part OS without being damaged.

EXAMPLES

One example of the structure of the first embodiment is described below.

Configuration

Figure 6:
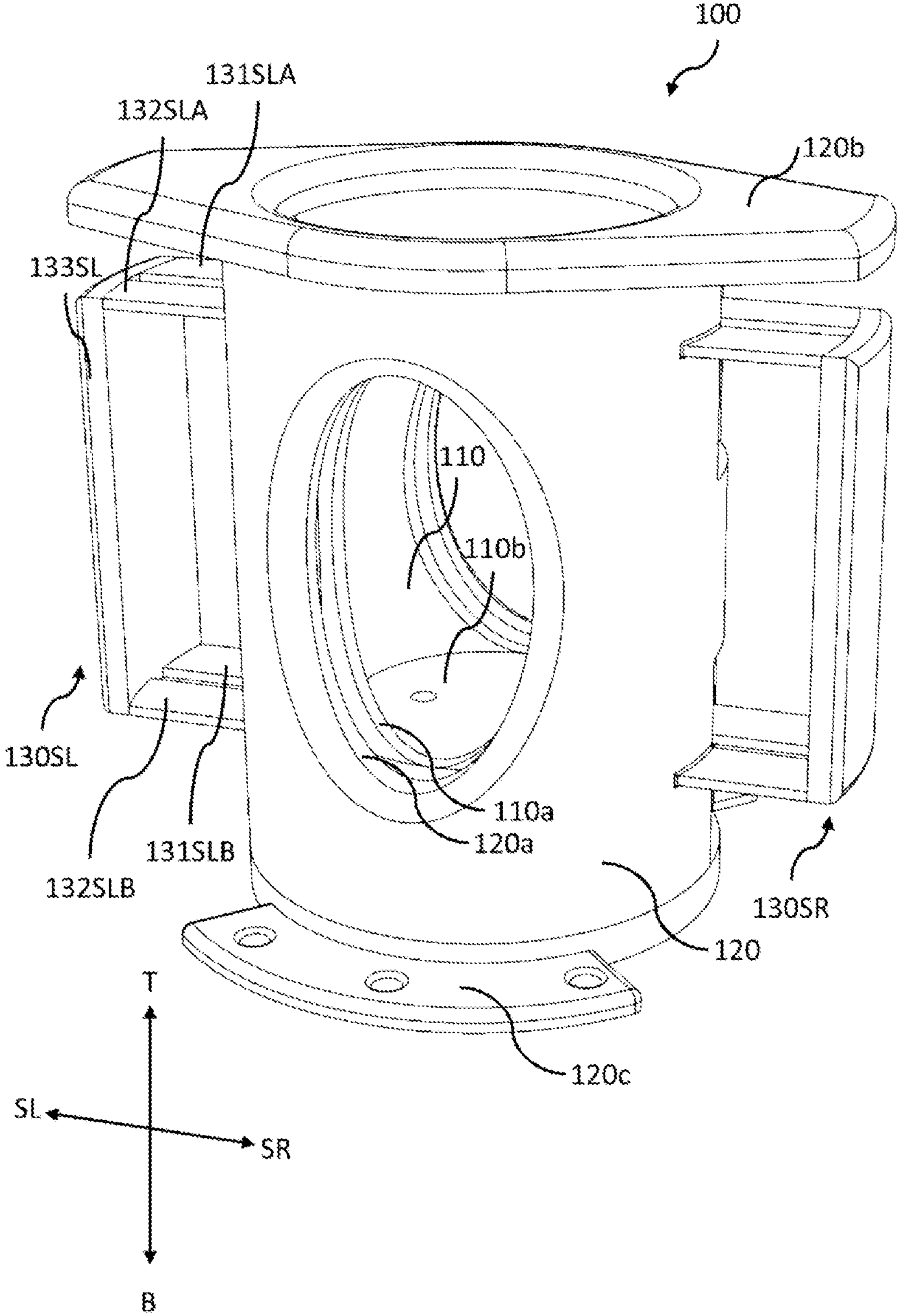
FIG. 6 is a perspective view of a structure of one example of the first embodiment of the present invention as viewed from an obliquely upper front surface side.
Figure 7:
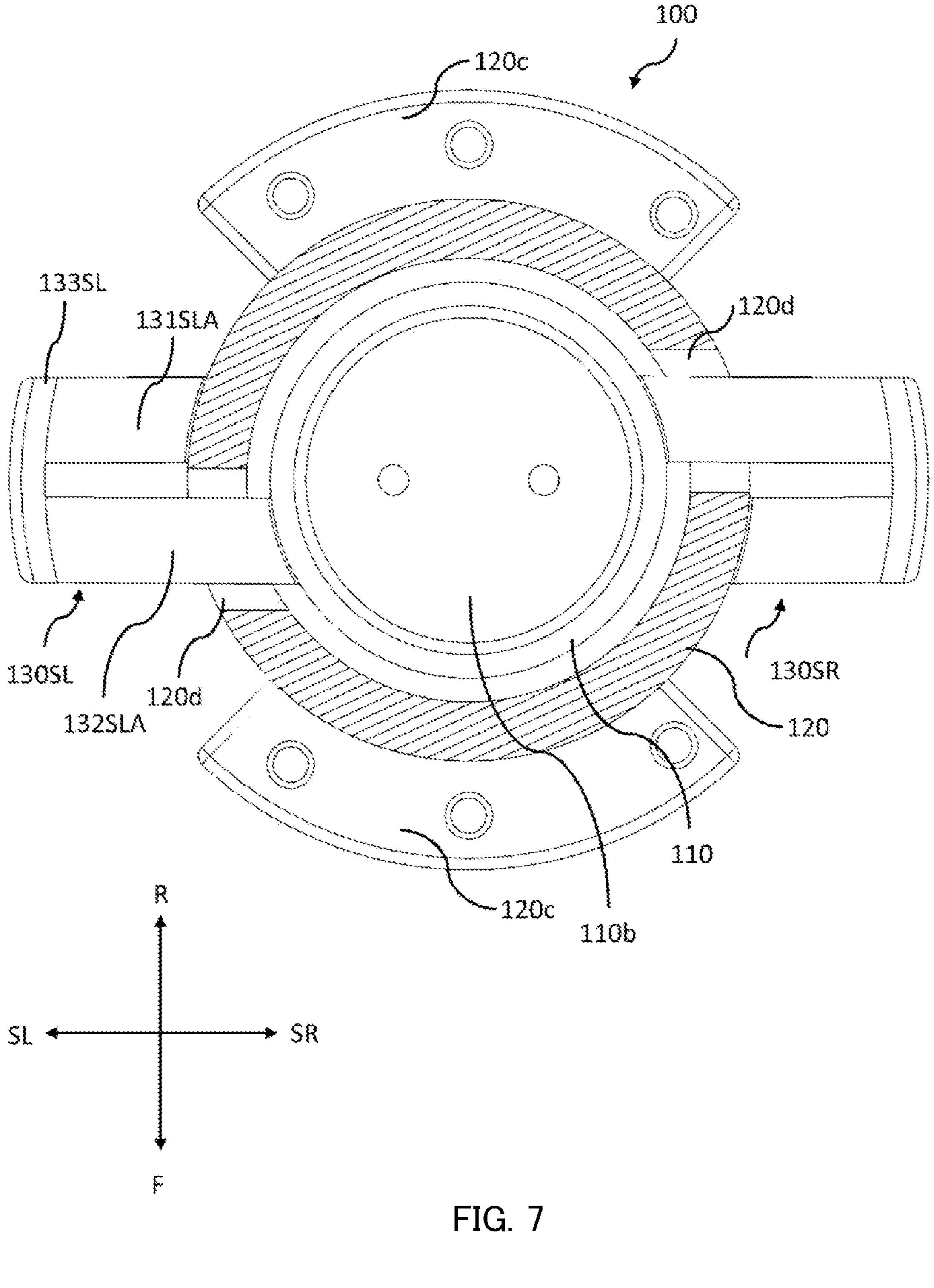
FIG. 7 is a plan view illustrating the structure of the one example of the first embodiment of the present invention in a state where a flange part on its upper side is cut.
Figure 8:
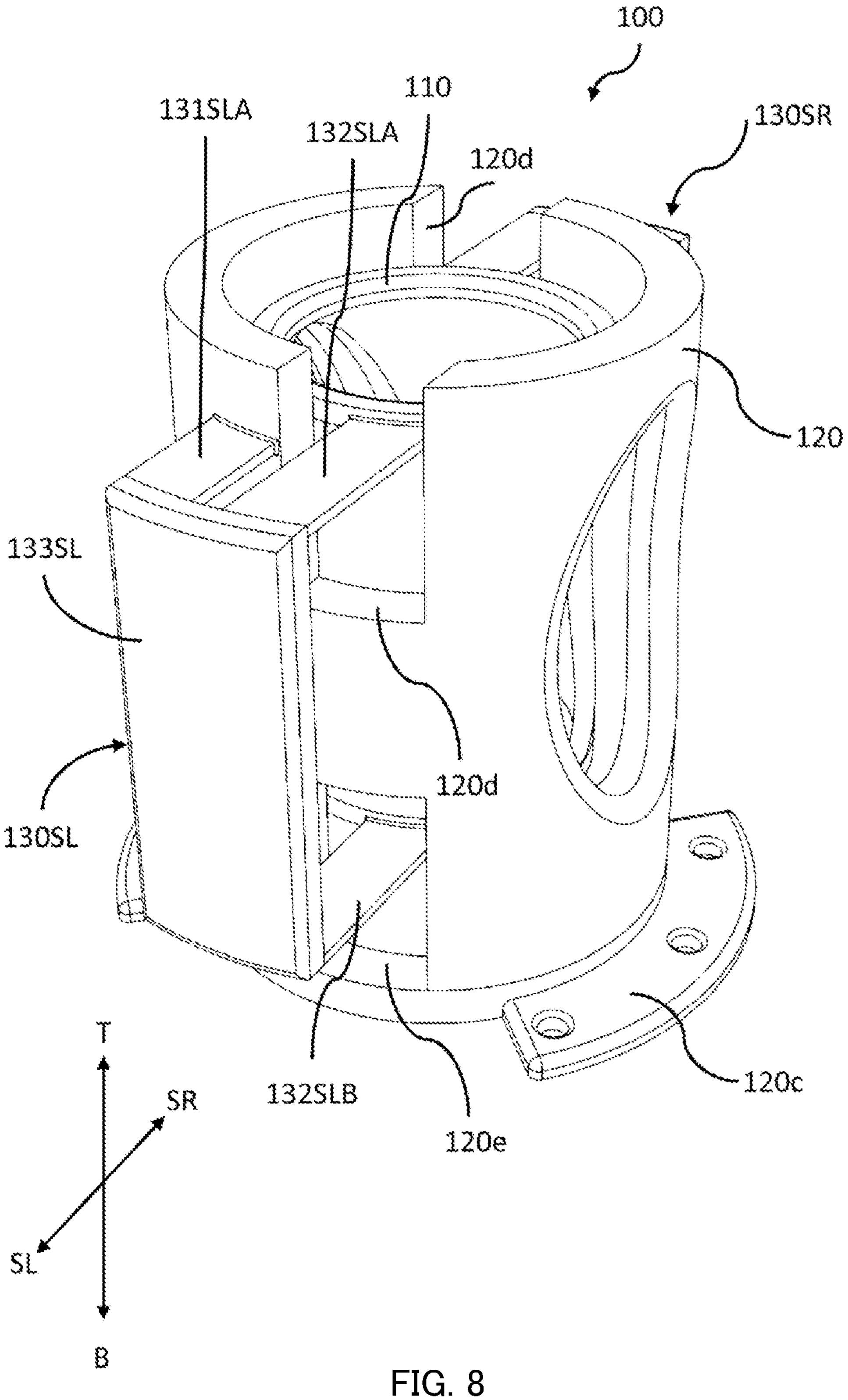
FIG. 8 is a perspective view illustrating the structure illustrated in FIG. 7 in the state where the flange part is cut, as viewed from a direction different from FIG. 6.
Figure 9:
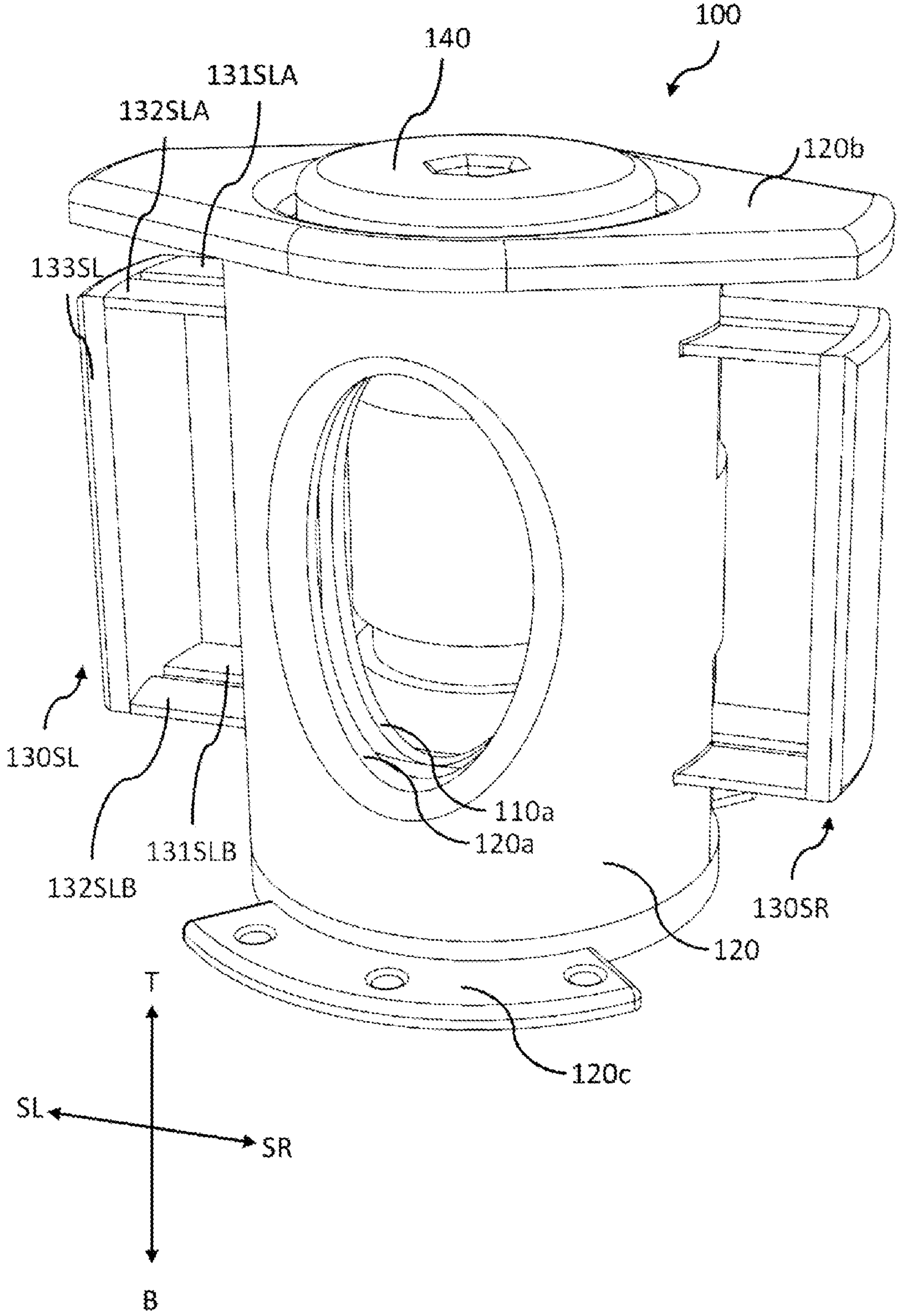
FIG. 9 is a perspective view illustrating a state where a vibrating member is housed in a vibration part of the structure of the one example of the first embodiment of the present invention.
Figure 10:
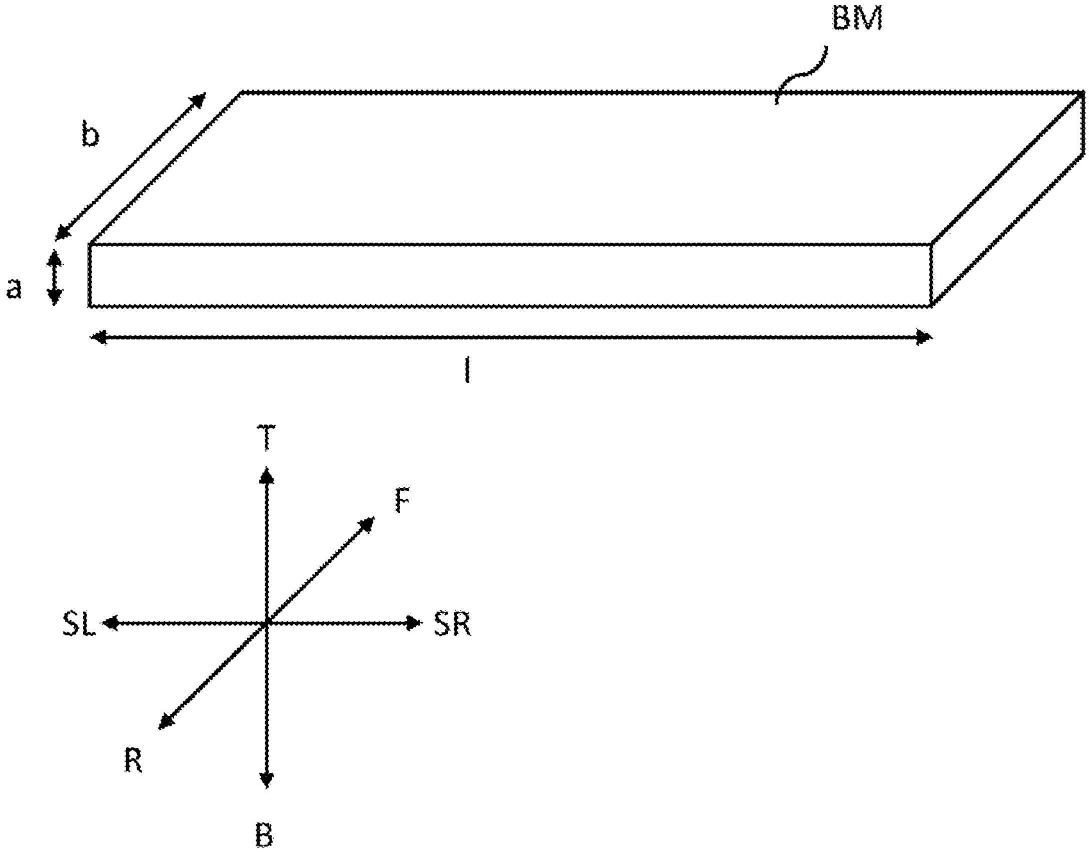
FIG. 10 is a perspective view illustrating an exemplary structure with anisotropy ab out stiffness.

FIG. 6 is a perspective view of a structure of one example of the first embodiment as viewed from an obliquely upper front surface side. FIG. 7 is a plan view illustrating the structure of the one example of the first embodiment in a state where a flange part on its upper side is cut. FIG. 8 is a perspective view illustrating the structure illustrated in FIG. 7 in the state where the flange part is cut as viewed from a direction different from FIG. 6. FIG. 9 is a perspective view illustrating a state where a vibrating member is housed in a vibration part of the structure of the one example of the first embodiment. FIG. 10 is a perspective view illustrating an exemplary structure with anisotropy about stiffness.

When the vibration part holds the vibrating member linearly vibrating back and forth along the first axis, the supporting part is required to support the vibration part such that the vibration part does not displace in a direction different from the first axis due to a vibration or a gravity acting on itself or the vibrating member while allowing the vibration part to displace along the first axis through vibration. Therefore, in this structure it is desirable that the dynamic stiffness in the vibration direction of the vibrating member be low enough to amplify the transmission of the vibration, and that the static stiffness be high enough to support the vibration part with its positional orientation stabilized.

A structure 100 of the present example is based on the above-described idea. In this example, the following describes an example where the supporting part of the structure 100 supports the vibration part in the state of holding a vibrating member 140 (see FIG. 9) vibrating in the up-down (T-B) direction, which is a direction along the first axis. It should be noted that the displaceable direction of a vibration part 110 and the vibration direction of the vibrating member held by the vibration part 110 are not limited to this.

As illustrated in FIGS. 6 to 9, the structure 100 includes the vibration part 110 that holds the vibrating member 140, a housing 120 that houses the vibration part 110, and two supporting parts 130SL and 130SR that support the vibration part 110 in a suspended manner in the housing 120. The two supporting parts 130SL and 130SR have configurations similar to each other although the arrangements are different from each other. Therefore, the matters common to each supporting part are described by using a reference numeral "130".

As an example, the structure 100 of the present example is disposed such that the plane including the front-rear (F-R) axis and the left and right (SR-SL) axis substantially coincides with the horizontal plane, and that the up-down (T-B) axis direction substantially coincides with the vertical direction.

As an example, the vibration part 110 has a substantially cylindrical hollow shape with a bottom surface part 110*b* and an opening on the upper side in the drawing, and the vibrating member 140 is housed in the hollow portion inside the cylinder as illustrated in FIG. 9. The vibrating member 140 is screw-fixed to the bottom surface part 110*b* through a screw hole formed in the bottom surface part 110*b*, for example. Preferably, the inner diameter of the vibration part 110 is substantially the same as the outer diameter of substantially cylindrical vibrating member 140 housed inside the vibration part 110. In this manner the vibration part 110 holding the vibrating member 140 inside is displaceable integrally with the vibrating member 140. The vibrating member 140 is a linear motor such as a voice coil motor, and the vibrating member 140 held by the vibration part 110 linearly vibrates back and forth along the up-down (T-B) axis in the drawing, for example. The vibration part 110 linearly vibrates back and forth along the up-down (T-B) axis in the drawing along with the vibration generated by the vibrating member 140.

Openings 110*a* are formed at opposite two locations in the side surface of the vibration part 110. The openings 110*a* have a role of allowing the hand of the worker to reach inside the vibration part 110 for attaching or detaching the vibrating member 140, and dissipating, to the outside of the vibration part 110, heat generated by the vibrating member 140 when the vibrating member 140 is driven.

As an example, the housing 120 has a substantially cylindrical shape opening at least at the upper side in the drawing, and houses the entirety or at least a part of the vibration part 110 in the hollow portion with the columnar shape around the central axis of the housing 120. In the example illustrated in FIG. 6 and the like, the housing 120 houses the vibration part 110 to surround the entire periphery of the vibration part 110.

Openings 120*a* are formed at opposite two locations in the side surface of the housing 120 at positions overlapping the openings 110*a* formed in the side surface of the vibration part 110 housed inside. The openings 120*a* also have a role of allowing the hand of the worker to reach inside the vibration part 110 for attaching or detaching the vibrating member 140, and dissipating heat generated by the vibrating member 140 to the outside of the housing 120 by driving the vibrating member 140.

Flange part 120*b* is formed around the opening at the upper part of the housing 120. In this example, the flange part 120*b* has a shape extending in the left-right direction of the housing 120 in the drawing as an example. The flange part 120*b* has a role of supporting the load when the user sits or leans on the upper part of the housing 120 in the drawing.

In addition, an attaching flange part 120*c* provided with a screw hole is formed around the outer periphery of the lower portion of the housing 120 in the drawing. In the housing 120 of this example, the attaching flange part 120*c* is formed at two locations on the front surface side and the back surface side in the drawing. The structure 100 can be fixed to the object (not illustrated in the drawing) to which the structure 100 is to be attached, by screw-fixing to the object through the screw hole of the attaching flange part 120*c*, for example.

Further, as more clearly illustrated in FIGS. 7 and 8, notch parts 120*d* and 120*e* are formed in the upper region and lower region, respectively, in the left and right side surfaces of the housing 120 in the drawing. The notch parts 120*d* and 120*e* allow a supporting body 132, of a supporting part 130 described later, fixed to the side surface of the vibration part 110 to protrude to the outside of the housing 120 through the side wall of the housing 120, and the notch parts 120*d* and 120*e* prevent the supporting body 132 from making contact with the side wall of the housing 120 when the supporting body 132 is displaced.

The supporting part 130 is configured to support the vibration part 110 in a suspended manner in the housing 120 in such a manner that the vibration part 110 linearly vibrates back and forth along the first axis (in the example illustrated in the drawing, the up-down (T-B) direction). More specifically, the vibration part 110 is disposed inside the internal space of the housing 120 in such a manner that it is concentric with the central axis of the housing 120 and that a gap is formed between the outer peripheral surface of the vibration part 110 and the inner peripheral surface of the housing 120. Further, the vibration part 110 is disposed at a height position at which the bottom surface of the vibration part 110 does not make contact with the bottom surface of the housing 120 or the object attached to the structure 100 even in the case where it is displaced by a maximum displacement amount assumed for the vibration in the up-down direction. The vibration part 110 is supported by the supporting part 130 at such an arrangement position.

A configuration of the supporting part 130 is described below with reference to a supporting part 130SL on the left side in the drawing. The supporting part 130SL includes supporting bodies 131SLA and 132SLA disposed on the upper side in the structure 100 in the drawing, supporting bodies 131SLB and 132SLB disposed on the lower side in the structure 100 in the drawing, and a coupling part 133SL. The supporting body 132SLA serves as a first supporting body with one end portion (first end portion) fixed to the vibration part 110, and the supporting body 131SLA serves as a second supporting body with one end portion (first end portion) fixed to the housing 120. The supporting body 132SLB serves as the first supporting body with one end portion (first end portion) fixed to the vibration part 110, and the supporting body 131SLB serves as the second supporting body with one end portion (first end portion) fixed to the housing 120. The other end portions (second end portions) of the supporting bodies 131SLA, 132SLA, 131SLB and 132SLB are fixed to the coupling part 133SL. The supporting body 131SLA and the supporting body 132SLA on the upper side in the drawing make up a first pair, and the supporting body 131SLB and the supporting body 132SLB on the lower side in the drawing make up a second pair. The other end portions of the supporting body 131SLA and the supporting body 132SLA of the first pair are fixed to the coupling part 133SL at a location near the upper end portion of the coupling part 133SL in the drawing, and the other end portions of the supporting body 131SLB and the supporting body 132SLB of the second pair are fixed to the coupling part 133SL at a location near the lower end portion of the coupling part 133SL in the drawing. Thus, the supporting body 131SLA and the supporting body 132SLA of the first pair and the supporting body 131SLB and the supporting body 132SLB of the second pair are disposed separately from each other along the up-down (T-B) axis direction in the drawing.

As clearly illustrated in FIG. 7, in the supporting body 131SLA and the supporting body 132SLA of the first pair, the length in the left and right (SL-SR) direction in the drawing of the supporting body 132SLA with one end portion fixed to the vibration part 110 is longer than the length in the same direction of the supporting body 131SLA with one end portion fixed to the housing 120. The same applies to the supporting body 131SLB and the supporting body 132SLB of the second pair, and the length in the left and right (SL-SR) direction in the drawing of the supporting body 132SLB with one end portion fixed to the vibration part 110 is longer than the length in the same direction of the supporting body 131SLB with one end portion fixed to the housing 120 although they are hidden by the supporting body 131SLA and the supporting body 132SLA of the first pair in FIG. 7.

The supporting body 131SLA and the supporting body 132SLA making up the first pair on the upper side in the drawing support the vibration part 110 by coupling the vibration part 110 and the housing 120 through the coupling part 133SL on the upper side in the vibration part 110 and the housing 120 in the drawing. In addition, the supporting body 131SLB and the supporting body 132SLB making up the second pair support the vibration part 110 by coupling the vibration part 110 and the housing 120 through the coupling part 133SL on the lower side in the vibration part 110 and the housing 120 in the drawing. The supporting part 130SL with the above-described configuration supports the vibration part 110 in such a manner that the relative position of the vibration part 110 with respect to the housing 120 is displaceable along the up-down (T-B) axis through elastic deformation of the supporting bodies 131SLA, 132SLA, 131SLB, and 132SLB.

Note that although the description is omitted, the supporting part 130SR on the other side has the same configuration as that of the supporting part 130SL. The two supporting parts 130SL and 130SR are disposed opposite to each other so as to be symmetric about the central axis of the structure 100 (which is also the concentric central axis of the vibration part 110 and the housing 120).

FIGS. 6 to 9 illustrate a state where the vibration part 110 is located at a neutral position with respect to the housing 120 in a state where no excitation force acts on the vibration part 110. When in this state an excitation force acts on the vibration part 110 in the upward (T-direction) direction in the drawing and the vibration part 110 is displaced in the upward direction in the drawing with respect to the housing 120, one end portions of the supporting body 132SLA and the supporting body 132SLB fixed to the vibration part 110 are also displaced correspondingly in the upward direction in the drawing. In this manner, the supporting body 132SLA and the supporting body 132SLB are displaced in the upward direction in the drawing in the state where they are bent and deformed in the elastic deformation region in such a manner that the end portions fixed to the vibration part 110 are located on the upper side in the drawing with the one end portions fixed to the vibration part 110 and the other end portions fixed to the coupling part 133SL serving as constraint ends.

Then, the coupling part 133SL to which the other end portions of the supporting body 132SLA and the supporting body 132SLB are fixed is also displaced correspondingly to some extent in the upward direction in the drawing. Along with the displacement of the coupling part 133SL in the upward direction in the drawing, the other end portions of the supporting body 131SLA and the supporting body 1321LB fixed to the coupling part 133SL are also displaced correspondingly in the upward direction in the drawing, and the supporting body 131SLA and the supporting body 131SLB are displaced in the upward direction in the drawing in the state where they are bent and deformed in the elastic deformation region in such a manner that the end portion fixed to the coupling part 133SL is located on the upper side in the drawing with the one end portions fixed to the coupling part 133SL and one end portions fixed to the housing 120 serving as constraint ends.

Conversely, when the excitation force acts on the vibration part 110 in the downward direction (B-direction) in the drawing in the state illustrated in FIGS. 6 to 9, the vibration part 110, the supporting bodies 131SLA, 132SLA, 131SLB, and 132SLB, and the coupling part 133SL are displaced or deformed in the direction opposite to the above-described direction. Note that although the description is omitted, each part of the supporting part 130SR on the other side operates in the same manner as each part of the supporting part 130SL. The vibration part 110 supported by the supporting parts 130SL and 130SR linearly vibrates back and forth in the up-down (T-B) direction in the drawing as described above with the excitation force of the vibrating member 140.

In this manner, the supporting part 130 supports the vibration part 110 in such a manner that the relative position of the vibration part 110 with respect to the housing 120 is displaceable along the first axis (the up-down (T-B) axis direction in the drawing) through elastic deformation of the supporting bodies 132SLA and 132SLB on the upper and lower sides in the drawing serving as the first supporting body and the supporting bodies 131SLA and 131SLB on the upper and lower sides in the drawing serving as the second supporting body.

Note that in the state where the vibrating member 140 is housed in the vibration part 110 as illustrated in FIG. 9, the vibration part 110 is displaced downward in the drawing to some extent by the weight of the vibrating member 140 in comparison with the state where the vibrating member 140 is not housed in the vibration part 110. Further, in the state where the vibrating member 140 is housed in the vibration part 110, the upper part of the vibrating member 140 in the drawing slightly protrudes to the outside of the housing 120 from the top surface of the flange part 120*b* at the upper part of the housing 120. Therefore, when the user sits or leans on the upper part of the housing 120 in the drawing, the vibration part 110 is further pushed down in the drawing until the upper part of the vibrating member 140 in the drawing is located at substantially the same height as the top surface of the flange part 120*b* at the upper part of the housing 120, and the vibration part 110 is held by the supporting parts 130SL and 130SR with this position as the neutral position. Note that the load of the user's body at this time is supported by the flange part 120*b* of the housing 120, and the top surface of the upper part of the vibrating member 140 in the drawing pushed down in the drawing together with the vibration part 110 is in contact with the user's body.

The supporting part 130 is configured to have a dynamic stiffness that amplifies at least a vibration of a predetermined vibration frequency, i.e., a vibration in a frequency band including the predetermined frequency in the back-and-forth linear vibration generated along the up-down (T-B) axis by the vibration part 110 in the state of holding the vibrating member 140. The above-described dynamic stiffness of the supporting part 130 can be set in consideration of the load assumed to be applied to the supporting part 130 through the vibration part 110 (e.g., the load of the weight of the vibration part 110 holding the vibrating member 140, or the load that acts on the vibration part 110 due to the body of the user sitting or leaning on the structure 100).

The vibration part 110 can generate the vibration with different frequencies depending on the speed of the back-and-forth linear vibration generated by the vibrating member 140. The supporting part 130 allows for amplification of the vibration in a frequency band including a predetermined frequency at which a higher vibration intensity is desired to be achieved in the above-described frequencies. On the other hand, the supporting part 130 is configured to have a static stiffness required for supporting the vibration part 110. That is, the supporting part 130 can ensure a rigidity (static stiffness) enough to stabilize the positional orientation of the vibration part 110 for the assumed load, and can achieve a high vibration intensity for at least the above-described predetermined vibration frequency in the back-and-forth linear vibration generated by the vibration part 110.

More specifically, the supporting part 130 is configured to have a lower dynamic stiffness for the force applied along the vibration direction of the vibration part 110 in the state of holding the vibrating member 140 (i.e., the force applied along the up-down (T-B) axis), while achieving a static stiffness for the design load. The supporting part 130 can meet both the limitation on the dynamic stiffness and the limitation on the static stiffness with a structure having anisotropy about the rigidity, for example.

Further, as an example, the supporting part 130 is configured such that the rigidity against the force applied along another direction is higher than the rigidity against the force applied along the vibration direction of the vibration part 110 in the state of holding the vibrating member 140.

The rigidity against the force applied along another direction is all of, or at least one of the following, for example.

The rigidity against the moment around the up-down (T-B) axis

The rigidity against the force applied along the front-rear (F-R) axis

The rigidity against the moment around the front-rear (F-R) axis

The rigidity against the force applied along the left-right (SL-SR) axis

The rigidity against the moment around the left-right (SL-SR) axis

A beam BM illustrated in FIG. 10 is an example of the structure having the anisotropy about the rigidity, and corresponds to the supporting bodies 131SLA, 132SLA, 131SLB, and 132SLB in the present example. In the beam BM, a dimension a in the vibration direction of the vibration part 110 in the state of holding the vibrating member 140 (i.e., the up-down (T-B) axis) is smaller than a dimension b in the front-rear (F-R) axis and a dimension 1 in the left-right (SL-SR) axis.

The rigidity of the case where a force is applied to the right end (SR end) of the beam BM along the up-down (T-B) axis with the left end (SL end) of the beam BM fixed is represented by $K_{b1} \propto Ea^3b/l^3$. Here, E represents the Young's modulus. On the other hand, the rigidity of the case where a force is applied to the right end (SR end) of the beam BM along the front-rear (F-R) axis with the left end (SL end) of the beam BM fixed is $K_{b2} \propto Eab^3/l^3$. That is, $K_{b2}/K_{b1} \propto b^2/a^2$ holds. In this manner, with the dimension a in the up-down (T-B) axis smaller than the dimension b in the front-rear (F-R) axis and the dimension 1 in the left-right axis (SL-SR axis), the rigidity against the force applied along the up-down (T-B) axis can be set to a rigidity smaller than the rigidity against the force applied along other directions.

Also in a structure with a shape that is wavy in the up-down (T-B) direction (so-called corrugated plate), the rigidity against the force applied along the up-down (T-B) axis is smaller than the rigidity against the force applied along other directions.

In this manner, with the structure configured with an appropriate shape and dimension, the rigidity with respect to a specific direction can be reduced while increasing the rigidity with respect to other directions. More specifically, with each supporting body of the supporting part 130 (e.g., the supporting body 131SLA, the supporting body 131SLB, the supporting body 132SLA, and the supporting body 132SLB) configured as a beam having an external shape with the dimension in the direction along the first axis (i.e., up-down (T-B) direction) smaller than the dimension in the direction orthogonal to the first axis (front-rear (F-R) direction or left and right (SL-SR) direction), the dynamic stiffness with respect to the direction along the first axis of the supporting part 130 can be reduced.

In the present example, the supporting bodies 131 and 132 of each supporting part 130 are configured to have the above-described rigidity characteristics, and the two supporting parts 130SL and 130SR are disposed opposite to each other so as to be symmetric about the central axis of the structure 100 (which is also the concentric central axis of the vibration part 110 and the housing 120), and thus, the vibration part 110 is supported by the supporting part 130 in such a manner that it is displaceable in the up-down (T-B) direction in the drawing with respect to the housing 120 while it is not substantially displaced in other directions. Note that as described above, the supporting bodies 131SLA, 132SLA, 131SLB, and 132SLB of the supporting part 130 have a relatively low dynamic stiffness in the up-down (T-B) direction in the drawing, while having a static stiffness in the same up-down (T-B) direction in the drawing that can support at least the load of the weight of the vibration part 110 in the state of supporting the vibrating member 140, and the load that is applied to the vibration part 110 when the vibration part 110 supporting the vibrating member 140 is pushed in the downward direction (B) in the drawing by the user's body in the above-described manner.

The coupling part (e.g., the coupling part 133SL) of the supporting part 130 is disposed separately from the housing 120 with respect to the direction orthogonal to the vibration direction of the vibration part 110 in the state of holding the vibrating member 140 (i.e., up-down (T-B) direction). Therefore, each supporting body (e.g., the supporting body 131SLA, the supporting body 131SLB, the supporting body 132SLA, and the supporting body 132SLB) of the supporting part 130 protrudes radially outward from the outer peripheral surface of the housing 120 as viewed from above (T-direction) as illustrated in FIG. 7, for example.

The greater the distance between the coupling part 133 of the supporting part 130, and the vibration part 110 and the housing 120, the greater the ratio of the dimension of each supporting body in the direction (left and right (SL-SR) direction) orthogonal to the up-down (T-B) axis with respect to the dimension in the direction along the up-down (T-B) axis, and thus the more the dynamic stiffness with respect to the vibration direction (the up-down (T-B) direction in the drawing) of the supporting part 130 can be reduced. On the other hand, the smaller the distance between the coupling part 133 of the supporting part 130, and the vibration part 110 and the housing 120, the more the structure 100 can be made compact. The dimension of each part including the length of each supporting body can be set as necessary in consideration of the size of the structure 100, the weight of the vibrating member 140 and the like such that the supporting part 130 can amplify the vibration of the vibration part 110 vibrating at a frequency of the band including the desired vibration frequency.

Operation

An operation of the structure of the present example is described below.

When the vibration part 110 in the state of holding the vibrating member 140 is in a non-vibration state, no excitation force is applied to the supporting part 130. On the other hand, even when the vibration part 110 is in a non-vibration state, the above-described load (e.g., the load of the weight of the vibration part 110 holding the vibrating member 140, or the load that acts on the vibration part 110 due to the body of the user sitting or leaning on the structure 100) may be applied to the supporting part 130. However, the supporting part 130 has the static stiffness with which the displacement amount of the supporting part 130 falls within the designed acceptable range with respect to the application direction of the design load. Therefore, when the vibration part 110 is in a non-vibration state, the deformation of each supporting body of the supporting part 130 falls within the acceptable range, and the supporting part 130 is located at the neutral position after the application of the above-described load and the displacement.

When the vibrating member 140 held by the vibration part 110 is set to a vibration state, and the vibration part 110 holding the vibrating member 140 is displaced upward (T-direction) in the drawing, the excitation force in the upward (T-direction) direction in the drawing is also applied to the supporting part 130. On the other hand, when the vibration part 110 holding the vibrating member 140 is displaced downward (B-direction) in the drawing, the excitation force in the downward (B-direction) direction in the drawing is also applied to the supporting part 130.

The supporting part 130 is configured to have a dynamic stiffness that amplifies the vibration of at least the above-described predetermined frequency in the back-and-forth linear vibration in the up-down (T-B) direction in the drawing generated by the vibration part 110 in the state of holding the vibrating member 140. In this manner, the vibration intensity of the back-and-forth linear vibration of the vibration part 110 in the up-down (T-B) direction in the drawing can be increased at least at the above-described predetermined vibration frequency of the vibration part 110.

Accordingly, in the vibration device (see FIG. 9) composed of the structure 100 of the present example with the vibrating member 140 held by the vibration part 110, when the vibrating member 140 linearly vibrates back and forth in the up-down (T-B) direction in the drawing with the top surface of the upper part of the vibrating member 140 in contact with the user's body, the vibration part 110 holding it begins to linearly vibrate back and forth in the same direction, and, when the vibration frequency finally reaches the above-described predetermined frequency, resonance occurs with the natural frequency of the vibration, with respect to the up-down (T-B) direction in the drawing, of the system including the vibration part 110 holding the vibrating member 140 and the supporting part 130, thus amplifying the back-and-forth linear vibration of the vibration part 110 holding the vibrating member 140 in the up-down (T-B) direction in the drawing. As a result, each time the top surface of the upper part of the vibrating member 140 held by the vibration part 110 is displaced upward (T) in the drawing, the top surface of the upper part of the vibrating member 140 more strongly makes contact with the user's body, thus allowing the user to more strongly feel the acoustic sensory effect of the vibration device in the frequency region. At this time, the user will feel vibrations with the body in addition to the sound and images of the audio/visual content (such as movies and live music images) the user is watching, which allows for a stronger sense of immersion in that content.

Further, in the structure 100 of the present example, the vibration part 110 is supported by the supporting part 130 in a suspended manner so as not to make contact with the inner wall surface and bottom surface of the housing 120 and the like, and this suspension state is maintained during the back-and-forth linear vibration of the vibration part 110 in the up-down (T-B) direction in the drawing. In this manner, the vibration of the vibration part 110 is separated from the housing 120. In this manner, when the vibration part 110 linearly vibrates back and forth in the up-down (T-B) direction in the drawing, the vibration part 110 and the vibrating member 140 held by the vibration part 110 do not make contact with the inner wall surface and bottom surface of the housing 120 and the like, and thus transmission of the vibration of the vibration part 110 to the housing 120 is suppressed, and as a result the vibration transmitted from the housing 120 to the outside can be suppressed. In this manner, in an exemplary case where a plurality of vibration devices disposed side by side is used, a situation where the vibration from a certain vibration device propagates to another vibration device and interference with the vibration of the other vibration device occurs can be suppressed, thus allowing the user to perceive the vibration of each vibration device with a higher resolution.

In the vibration device including the structure 100 and vibrating member 140 of the present example, the vibration direction of the back-and-forth linear vibration of the vibrating member 140 held by the vibration part 110 and the displaceable direction of the vibration part 110 supported by the supporting part 130 coincide with each other in the up-down (T-B) direction in the drawing, and the displacement of the vibration part 110 in other directions does not substantially occur. Therefore, most of the vibration energy of the vibrating member 140 is used to cause the vibration part 110 to linearly vibrate back and forth in the up-down (T-B) direction in the drawing. Note that when the vibration part 110 is caused to linearly vibrate back and forth in the up-down (T-B) direction in the drawing, the second-order, third-order, . . . nth-order vibration modes may sequentially occur at the vibration part 110 as the vibration frequency gradually increases, and the vibration part 110 may vibrate in other directions than the up-down (T-B) direction in the drawing depending on aspects of the vibration modes. Even in this case, the vibration part 110 can be prevented from being displaced in a direction other than the up-down (T-B) direction in the drawing due to the vibration that may be generated in that vibration direction because the structure 100 of the present example is configured such that the vibration part 110 is not substantially displaced in directions other than the up-down (T-B) direction in the drawing as described above. Therefore, even when the vibration part 110 is vibrated in a direction other than the up-down (T-B) direction in the drawing in a certain vibration mode, the outer peripheral surface of the vibration part 110 can be prevented from making contact with the inner peripheral surface of the housing 120, for example.

Note that with reference to FIG. 4 again, in the case of increasing the vibration intensity of the back-and-forth linear vibration of the vibration part 110 in the up-down (T-B) direction in the drawing at a lower frequency, the shape of each supporting body and the dimension of each part are designed so as to reduce the dynamic stiffness kd of the entirety of the supporting bodies 131SLA, 132SLA, 131SLB, and 132SLB of the supporting part 130 in the up-down (T-B) direction in the drawing. In this manner, the natural frequency fu of the vibration of the system composed of the vibration part 110 holding the vibrating member 140 and the supporting part 130 with respect to the up-down (T-B) direction in the drawing is shifted to a lower frequency region, and the vibration intensity in the lower frequency region can be increased. On the other hand, in the case of increasing the vibration intensity of the back-and-forth linear vibration of the vibration part 110 in the up-down (T-B) direction in the drawing at a higher frequency, the shape of each supporting body and the dimension of each part are designed so as to increase the dynamic stiffness kd of the entirety of the supporting bodies 131SLA, 132SLA, 131SLB, and 132SLB of the supporting part 130 in the up-down (T-B) direction in the drawing. In this manner, the natural frequency fu of the vibration of the system composed of the vibration part 110 holding the vibrating member 140 and the supporting part 130 with respect to the up-down (T-B) direction in the drawing is shifted to a higher frequency region, and the vibration intensity in the higher frequency region can be increased.

As described above, the structure 100 of the present example includes the supporting part 130. The supporting part 130 is configured to have a dynamic stiffness that amplifies a vibration of at least a predetermined vibration frequency (a vibration in a frequency band including the predetermined frequency vibration) in the back-and-forth linear vibration generated by the vibration part 110 in the state of holding the vibrating member 140 with respect to the direction of the back-and-forth linear vibration. As an example, the predetermined vibration frequency is a frequency at which a higher vibration intensity is desired to be obtained by amplifying the vibration of the vibration part 110. On the other hand, the supporting part 130 is configured to have a static stiffness required for supporting the vibration part 110 against the assumed load with respect to the application direction of the designed external force. Therefore, with this structure 100, the vibration part 110 can be supported in such a manner that the positional orientation is stable against a load within the assumed range in the design, and the vibration of at least the above-described predetermined frequency can be amplified in the back-and-forth linear vibration generated by the vibration part 110. That is, with this structure 100, the load carrying capacity and the vibration intensity required for the vibration device can be satisfied.

Further, in the structure 100 of the example, since the displacement (vibration) direction of the vibration part 110 and the vibration direction of the vibrating member 140 held by the vibration part 110 coincide with each other, and the vibration part 110 is supported in a suspended manner by the supporting part 130 inside the housing 120, the generation of the vibration of the vibration part 110 in the vibration direction and a vibration in a direction different from this direction can be suppressed, and propagation of such vibrations to the outside of the structure 100 can be suppressed.

Note that in the present example, an example is described in which the vibration part 110 in the state of holding the vibrating member 140 generates the back-and-forth linear vibration along the up-down (T-B) axis in the drawing that substantially coincides with the vertical direction, and the weight of the vibration part 110 holding the vibrating member 140, their excitation forces (inertia forces), and the load from the user's body are applied as the designed external force to the vibration part 110, for example. In the present example, the supporting part 130 is configured to have a dynamic stiffness that amplifies the vibration of at least the above-described predetermined vibration frequency of the vibration part 110 with respect to the up-down (T-B) direction, which is the vibration direction of the vibration part 110, and the supporting part 130 is configured to have a static stiffness required for supporting the vibration part 110 with respect to the application direction of the designed external force. However, the vibration direction of the vibration part 110 supported by the supporting part 130 and the application direction of the designed external force to the supporting part 130 are not limited to this. In addition, the vibration direction of the vibration part 110 supported by the supporting part 130 is not limited to one direction. In the case where the vibration part 110 linearly vibrates back and forth in a plurality of different directions, the supporting part 130 may be configured to have a dynamic stiffness that amplifies the vibration of a predetermined vibration frequency with respect to each vibration direction.

In addition, in the present example, an example is described in which the structure 100 includes the two supporting parts 130SL and 130SR disposed opposite to each other so as to be symmetric about its central axis, the number of supporting parts 130 of the structure 100 is not limited to this, and it is possible to adopt a configuration in which supporting parts 130 of any number equal to or greater than 3 is provided. In this case, preferably, supporting parts 130 are disposed at even intervals around the central axis of the structure 100. Note that even in the case where the structure 100 includes only one supporting part 130, it is possible to adopt a configuration in which the structure 100 includes only one supporting part 130 under a certain condition that the vibrating member 140 and the vibration part 110 do not make contact with the inner surface of the housing 120 when the vibration part 110 holding the vibrating member 140 vibrates.

(2) Second Embodiment

Figure 11:
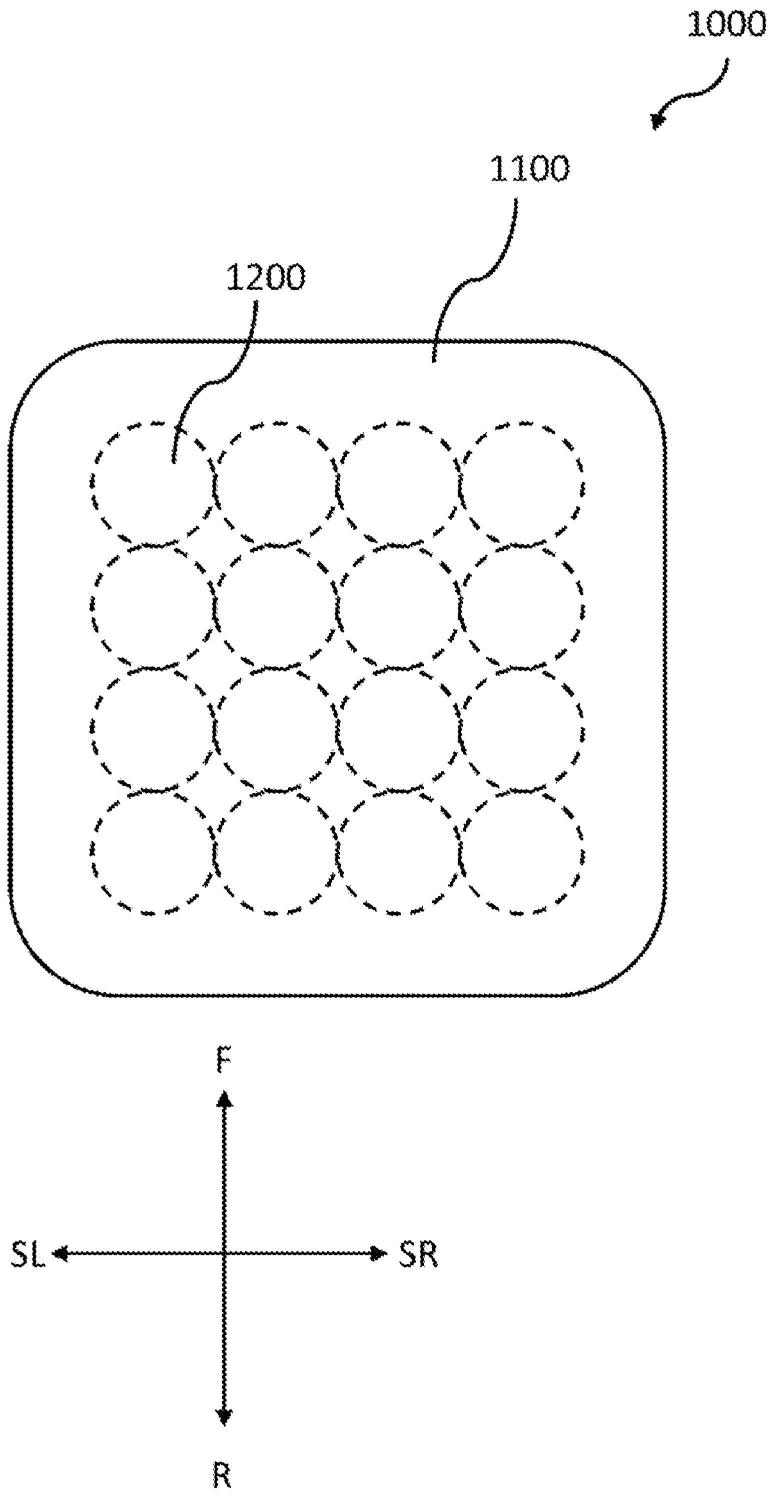
FIG. 11 is a diagram illustrating an arrangement of a plurality of vibration devices of a sensory acoustic apparatus of a second embodiment of the present invention as viewed from above.
Figure 12:
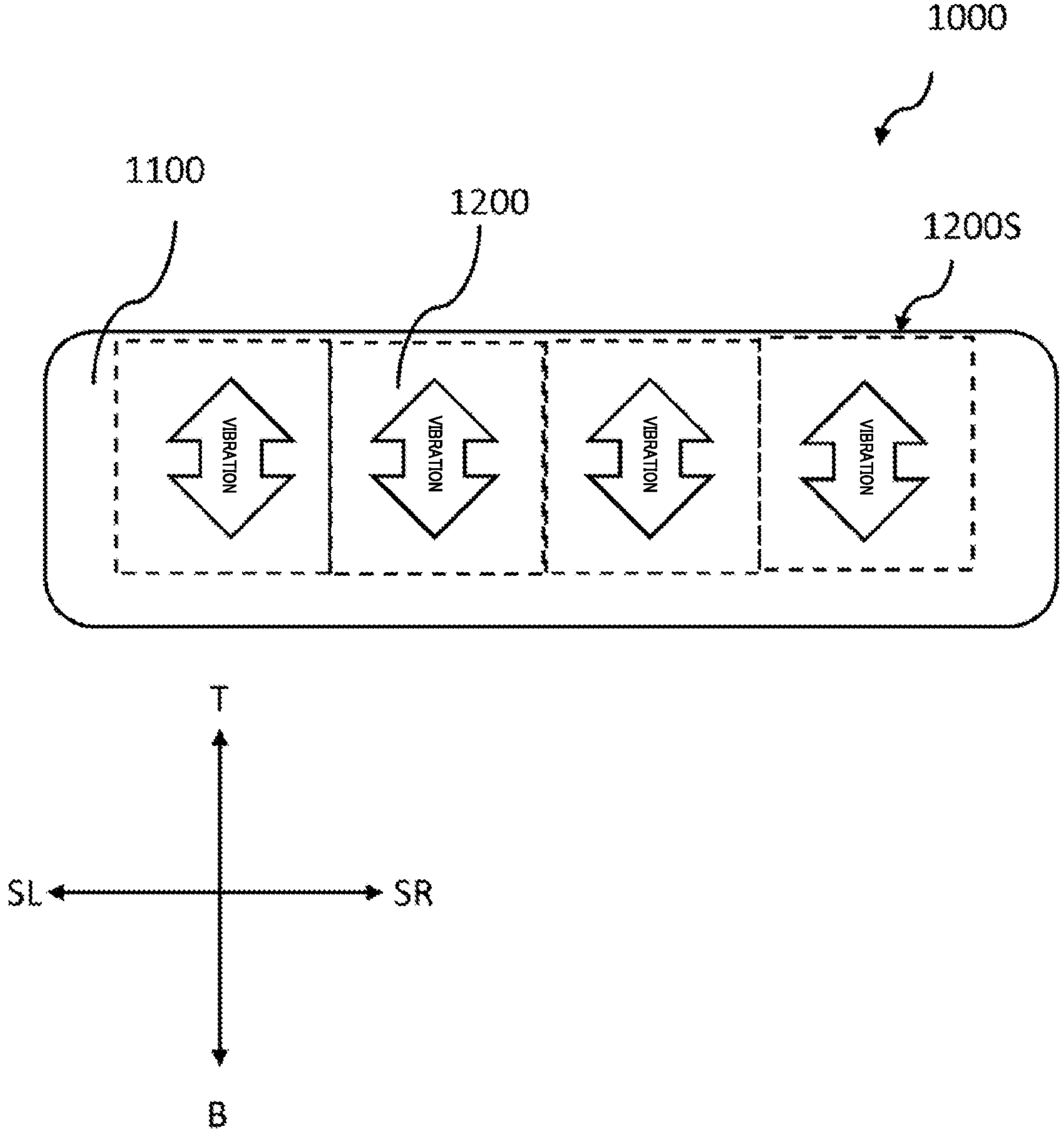
FIG. 12 is a diagram illustrating a vibration direction of the plurality of vibration devices in the sensory acoustic apparatus of the second embodiment of the present invention.

A second embodiment is described below. FIG. 11 is a diagram illustrating an arrangement of a plurality of vibration devices in a sensory acoustic apparatus of the second embodiment as viewed from above. FIG. 12 is a diagram illustrating a vibration direction of the plurality of vibration devices in the sensory acoustic apparatus of the second embodiment.

As illustrated in FIG. 11, a sensory acoustic apparatus 1000 includes a housing 1100. The housing 1100 may be a cushion, a chair, a sofa, a bed, a mattress or the like, or a part of them, for example. As an example, a plurality of vibration devices 1200 is disposed in a matrix along a horizontal plane inside the housing 1100. Note that the arrangement of the plurality of vibration devices 1200 inside the housing 1100 is not limited to a matrix form, and they may be arranged in any other forms such as an array form, for example.

As an example, the vibration device 1200 is configured by incorporating the vibrating member 140 in the vibration part 110 of the structure 100 of the example of the first embodiment.

As illustrated in FIG. 12, the plurality of vibration devices 1200 forms a vibration transmission surface 1200S for transmitting vibration to the body of the user of the sensory acoustic apparatus 1000. In the example described with reference to FIG. 9, this vibration transmission surface 1200S is formed at the top surface of the upper part of the vibrating member 140 held by the vibration part 110 of each vibration device 1200. The vibration transmission surface 1200S is not limited to a flat surface, but may be a curved surface, a combination of a plurality of flat surfaces, a combination of a plurality of curved surfaces, or a combination of N (N≥1) flat surfaces and M (M≥1) curved surfaces. The sensory acoustic apparatus 1000 provides the user with an acoustic sensory by stimulating the user's body with the vibration of the plurality of vibration devices 1200 through the vibration transmission surface 1200S. The plurality of vibration devices 1200 is configured to be able to individually control at least one of the amplitude, frequency, and phase of the vibration with a controller not illustrated in the drawing. By controlling each operation of the plurality of vibration devices 1200 with the controller, the vibration intensity distribution of the plurality of vibration devices 1200 can be changed in accordance with the scene of the audio/visual content the user is watching, for example. An example of such a change of the vibration intensity distribution is that the vibration intensities of some vibration devices 1200 of the plurality of vibration devices 1200 are increased and the region with the high vibration intensity is moved such that the user feels the movement of waves.

Each vibration device 1200 is configured such that the vibration part in the state of holding the vibrating member linearly vibrates back and forth along the normal to the vibration transmission surface 1200S at the position of the vibration device 1200. In the example illustrated in FIG. 12, the vibration transmission surface 1200S is approximately parallel to the horizontal plane, and the vibration device 1200 vibrates in a substantially vertical direction.

Here, for example, as described with reference to FIGS. 6 to 9 in the example of the first embodiment, in the case where the vibration device 1200 is configured such that the vibration part is supported by the supporting part in a suspended manner with respect to the housing and that the vibration direction of the vibrating member held by the vibration part and the displaceable direction of the vibration part supported by the supporting part coincide with each other, transmission of the vibration generated at a certain vibration device 1200 to the housing 1100 is suppressed, and thus interference (resonance or cancellation) of that vibration with the vibration generated by another vibration device 1200 through the housing 1100 can be prevented. In this manner, the user can clearly feel the vibration generated by each vibration device 1200 without being affected by the vibration of another vibration device 1200. That is, the sensory acoustic apparatus 1000 of the present embodiment can provide the user with acoustic sensory with a high resolution.

As described above, the sensory acoustic apparatus 1000 of the second embodiment includes a plurality of vibration devices 1200. Each vibration device 1200 is configured by incorporating a vibrating member in the structure 100 of each example of the first embodiment. In this manner, the sensory acoustic apparatus 1000 with excellent load carrying capacity and vibration intensity can be provided. That is, this sensory acoustic apparatus 1000 can provide the user with an acoustic sensory with a high resolution against the load of the user's weight.

Note that the sensory acoustic apparatus 1000 may be composed of the vibration device described in the example of the first embodiment.

(3) Third Embodiment

A third embodiment of the present invention is described below. The above-described each embodiment relates to provision of a structure or the like that can provide a rigidity capable of supporting the assumed load while amplifying the vibration of the vibration source in the vibration direction in which the vibration intensity is desired to be increased by isolating the vibration mode in that vibration direction from the vibration modes of other directions, whereas the third embodiment relates to provision of a structure or the like that can provide a rigidity capable of supporting the assumed load while attenuating the vibration in the vibration direction in which the vibration intensity is desired to be reduced by isolating the vibration mode in that vibration direction from the vibration modes of other directions.

The dynamic stiffness of the supporting part in the structure of the present embodiment is described below with reference to FIGS. 3 and 4 again. FIG. 3 is the diagram illustrating the vibration model in the system of FIG. 1, and FIG. 4 is the graph illustrating the frequency characteristics of the vibration transmittance of the model of FIG. 3.

The supporting part SPT of the present embodiment is configured to have a dynamic stiffness that attenuates the vibration of at least the vibration frequency f in the vibrations generated by the vibration part OS in the state of holding the vibrating member. This is described below with reference to FIG. 3 as the vibration transmission characteristics from the vibration part OS to the housing HS. At each frequency, the vibration transmission characteristics from the vibration part OS to the housing HS is determined by the mass m of the vibration part OS and the dynamic stiffness kd of the supporting part SPT with respect to the vibration direction of the vibration part OS.

As described in the first embodiment, the ratio F/F0 of the excitation force F transmitted to the housing HS with respect to the excitation force F0 generated by the vibration part OS in the state of holding the vibrating member is defined as the vibration transmittance. As illustrated with the solid line in the graph of FIG. 4, the model of FIG. 3 has the frequency characteristics in which the vibration transmittance gradually decreases, as the frequency increases, after exhibiting the excited vibration mode in which the vibration transmittance is increased. More specifically, the vibration transmittance of the model of FIG. 3 increases as the frequency increases in the frequency range equal to or smaller than fu, and reaches at its maximum at fu. Here, fu is the natural frequency of the model of FIG. 3. The vibration transmittance of the model of FIG. 3 gradually decreases in the frequency range equal to or greater than the natural frequency fu, and zero-crosses at $\sqrt{2}$fu. That is, in the model of FIG. 3 the vibration transmittance is smaller than 1, i.e., the vibration attenuation effect can be exhibited, in the frequency range greater than $\sqrt{2}$fu.

The natural frequency of the model of FIG. 3 is determined by the mass m and the dynamic stiffness kd. The lower the natural frequency with the reduced dynamic stiffness kd, the more the frequency region (anti-vibration region) where the vibration attenuation (vibration transmittance <1) can be achieved can be enlarged. As is clear from FIG. 4, the vibration attenuation region in the frequency characteristics of the system in which the natural frequency is set to fu' smaller than fu (the graph indicated by the dotted line in FIG. 4) is larger than the anti-vibration region in the frequency characteristics of the system of the natural frequency fu indicated by the solid line in FIG. 4. Since the mass m is a constant, the natural frequency fu can be reduced by reducing the dynamic stiffness kd. Therefore, from a view point of the vibration attenuation effect, the smaller the dynamic stiffness kd of the structure STR with respect to the vibration direction of the vibrating member OS, the more preferable.

Based on the above-described findings, in the supporting part SPT of the present embodiment the dynamic stiffness kd is set so as to have at least the natural frequency fu with which the vibration transmittance at the predetermined vibration frequency f at which the vibration transmission is especially desired to be reduced is smaller than 1, in the frequency components of the vibrations generated by the vibration part OS in the state of holding the vibrating member. The system including the supporting part SPT having such a dynamic stiffness kd and the vibration part OS exhibits an excited vibration mode in which the vibration transmittance at the vibration frequency f is smaller than 1. More specifically, the supporting part SPT is configured to have the dynamic stiffness kd with which for the given vibration direction, mass m, and vibration frequency f of the vibration part OS, the natural frequency fu of the system including the supporting part SPT and the vibration part OS is lower than $1/\sqrt{2}$ times the vibration frequency f.

Note that to what degree the natural frequency fu of the system including the supporting part SPT and the vibration part OS in the state of holding the vibrating member is set, and how the value of the dynamic stiffness kd is set for that, may be determined as necessary in accordance with what degree of the vibration attenuation effect is desired to be achieved at the predetermined vibration frequency f, i.e., in accordance with how much the vibration transmittance at the predetermined vibration frequency f is desired to be reduced.

The static stiffness of the structure of the present embodiment is the same as the static stiffness described with reference to FIG. 5 in the first embodiment, and therefore the description thereof is omitted here.

The structure of the present embodiment may include the same components as those of the structure 100 described in the example of the first embodiment. It should be noted that the supporting part in the structure of the example of the first embodiment is configured to have a dynamic stiffness that amplifies the transmission of the vibration of at least a predetermined frequency generated in at least one direction, whereas the supporting part of the structure of the present embodiment is configured to have a dynamic stiffness that attenuates the transmission of the vibration of at least a predetermined frequency generated in at least one direction.

EXAMPLES

Now an example of the structure of the third embodiment is described.

The structure of one example of the present embodiment includes the same components as those of the structure 100 described with reference to FIGS. 6 to 9. It should be noted that in the present example, the supporting part 130 (130SR and 130SL) in the structure 100 is configured to have a dynamic stiffness that attenuates a vibration of at least a predetermined vibration frequency, i.e., a vibration in a frequency band including the predetermined frequency, in the back-and-forth linear vibration generated by the vibration part 110 in the state of holding the vibrating member 140 along the up-down (T-B) axis, and can attenuate the vibration in the frequency band including a predetermined frequency in which the vibration is desired to be attenuated in the vibration of the frequencies that differ depending on the speed of the back-and-forth linear vibration generated by the vibrating member 140. On the other hand, the supporting part 130 has a static stiffness required for supporting the vibration part 110.

Note that the dimension of each part (the height, the length and thickness of the cross portion and the like) of each supporting part in the structure of the above-described example can be set as necessary in consideration of the size of the structure, the weight of the vibrating member and the like in such a manner that the supporting part can attenuate the vibration of the vibration part vibrating at a desired vibration frequency.

In this manner, the present embodiment can provide a structure that can provide a rigidity capable of supporting the assumed load while attenuating the vibration of the vibration source in the vibration direction in which the vibration intensity is desired to be reduced by isolating the vibration mode in that vibration direction from vibration modes in other directions.

(4) Modifications

Modifications of the embodiment are described below.

In the above description, an example is described in which the anisotropy about the stiffness of the supporting part is achieved by the shape of the supporting part assuming that the supporting part is composed of a homogenous material. The supporting part composed of a homogenous material generally has the advantage of high manufacturability. It should be noted that the anisotropy about the stiffness of the supporting part may be achieved by the components (e.g., a combination of different materials) of the material of the supporting part.

In the above description, an example is described in which the plurality of supporting parts supports the vibration part at a plurality of contact points. However, any number of supporting parts may support the vibration part at any number of contact points. Note that the term "contact point" does not limit the size of the contact area between the supporting part and the vibration part. The contact point may be read as another term such as contact region and contact surface as necessary.

Two or more of the supporting part, the vibration part, and the housing may be a part of different objects (articles).

Two or more of the supporting part, the vibration part, and the housing may be integrally shaped. In this manner, the number of components of the structure can be reduced, and the manufacturability of the structure can be improved.

In the examples of the first and third embodiments, an example is described in which the coupling part couples the multiple pairs each including the first supporting body and the second supporting body. However, the plurality of pairs may not be coupled with each other. More specifically, in the structure 100 according to the example of the first embodiment described with reference to FIG. 6 and the like, the supporting bodies 131SLA and 132SLA making up the first pair are coupled with the supporting bodies 131SLB and 132SLB making up the second pair through the coupling part 133SL. Alternatively, it is possible to adopt a configuration in which the supporting bodies 131SLA and 132SLA making up the first pair are coupled with each other and the supporting bodies 131SLB and 132SLB making up the second pair are coupled with each other, while the supporting bodies 131SLA and 132SLA of the first pair and the supporting bodies 131SLB and 132SLB of the second pair are not coupled with each other.

Although the embodiments of the invention have been described in detail above, the scope of the invention is not limited to the above embodiments. The above embodiments can be improved or modified in various ways to the extent that the main purpose of the invention is not departed from. Also, the above embodiments and variations can be combined.

The invention claimed is:

1. A structure comprising:

a vibration part configured to hold a vibrating member;

a housing configured to at least partially house the vibration part; and a supporting part configured to support the vibration part by coupling the vibration part and the housing, wherein the supporting part is configured to have a dynamic stiffness that amplifies or attenuates transmission of a vibration of at least a predetermined frequency in a vibration generated in at least one direction by the vibration part in a state of holding the vibrating member, and a static stiffness required for supporting the vibration part in the state of holding the vibrating member, wherein a system including the structure and the vibrating member has characteristics in which a vibration transmittance gradually decreases, as a vibration frequency of the vibration in the at least one direction increases, after exhibiting an excited vibration mode in which the vibration transmittance is increased, wherein in a case where the dynamic stiffness that amplifies the transmission of the vibration of at least the predetermined frequency is provided, the supporting part further has the dynamic stiffness that exhibits the excited vibration mode such that the vibration transmittance at the predetermined frequency is greater than 1, wherein in a case where the dynamic stiffness that attenuates the transmission of the vibration of at least the predetermined frequency is provided, the supporting part further has the dynamic stiffness that exhibits the excited vibration mode such that the vibration transmittance at the predetermined frequency is smaller than 1, wherein the supporting part is configured to support the vibration part so as to linearly vibrate back and forth along a first axis, and wherein the supporting part includes:

a first pair including a first supporting body coupled with the vibration part and a second supporting body coupled with the housing;

a second pair including a first supporting body coupled with the vibration part and a second supporting body coupled with the housing, the second pair being disposed at a position separated from the first pair along a direction of the first axis; and a coupling part configured to couple the first and second supporting bodies of the first pair and the first and second supporting bodies of the second pair.

2. The structure according to claim 1, wherein the supporting part supports the vibration part such that a relative position of the vibration part with respect to the housing is displaceable along the first axis through elastic deformation of the first supporting body and the second supporting body.

3. The structure according to claim 2, wherein each of the first supporting body and the second supporting body is a beam having an external shape with a dimension in a direction along the first axis smaller than a dimension in a direction orthogonal to the first axis.

4. The structure according to claim 1, wherein the housing includes a flange at least at one of end portions of the housing in a direction along the first axis.

5. The structure according to claim 4, wherein the flange is disposed at a position protruded than the vibration part and the supporting part in the direction along the first axis and is configured such that the flange does not make contact with the vibration part and the supporting part.

6. The structure according to claim 1, wherein two or more of the vibration part, the housing, and the supporting part are composed of a homogenous material.

7. The structure according to claim 1, wherein two or more of the vibration part, the housing, and the supporting part are integrally shaped.

8. A vibration device comprising:

the structure according to claim 1; and a vibrating member held by the vibration part of the structure.

9. A sensory acoustic apparatus comprising a plurality of the vibration devices according to claim 8.

10. The sensory acoustic apparatus according to claim 9, wherein the plurality of vibration devices forms a vibration transmission surface configured to transmit a vibration to a body of a user, and wherein each of the plurality of vibration devices is configured such that the vibration part linearly vibrates back and forth along a normal to the vibration transmission surface at a position of the respective vibration device.

* * * * *